United States Patent
Vong et al.

(10) Patent No.: US 12,032,898 B2
(45) Date of Patent: Jul. 9, 2024

(54) SYSTEM AND METHOD FOR DOCUMENT ANALYSIS OF A DESIGN DOCUMENT HAVING DESIGN ELEMENTS

(71) Applicant: Canva Pty Ltd, Surry Hills (AU)

(72) Inventors: Declan Robin Vong, Sydney (AU); Michelle Munn Wai Seeto, Five Dock (AU); Desiree Isabelle Surjadi, Surry Hills (AU); Suganth Sengottuvelappan, Sydney (AU); Cayden Joel Meyer, Sydney (AU)

(73) Assignee: Canva Pty Ltd, Surry Hills (AU)

( * ) Notice: Subject to any disclaimer, the term of this patent is extended or adjusted under 35 U.S.C. 154(b) by 0 days.

(21) Appl. No.: 17/920,788

(22) PCT Filed: Apr. 23, 2021

(86) PCT No.: PCT/AU2021/050364
§ 371 (c)(1),
(2) Date: Oct. 22, 2022

(87) PCT Pub. No.: WO2021/212179
PCT Pub. Date: Oct. 28, 2021

(65) Prior Publication Data
US 2023/0169261 A1    Jun. 1, 2023

(30) Foreign Application Priority Data
Apr. 23, 2020   (AU) .............................. 2020901276

(51) Int. Cl.
*G06F 40/10*   (2020.01)
*G06F 40/106*   (2020.01)
(Continued)

(52) U.S. Cl.
CPC .......... *G06F 40/166* (2020.01); *G06F 40/106* (2020.01); *G06F 40/109* (2020.01); *G06F 40/14* (2020.01)

(58) Field of Classification Search
CPC .... G06F 40/166; G06F 40/106; G06F 40/109; G06F 40/14
(Continued)

(56) References Cited

U.S. PATENT DOCUMENTS 8,392,828 B2 * 3/2013 Yoo ...................... G06F 40/106
715/255
10,691,875 B2 * 6/2020 Sasikumar ............ G06F 40/143
(Continued)

FOREIGN PATENT DOCUMENTS

WO    WO-2015061003 A1 *    4/2015    ........... G06F 17/212
WO    WO-2016022725 A1 *    2/2016    ........... G06F 17/212

OTHER PUBLICATIONS

How to Show or Hide PDF Toolbar in adobe acrobat pro; Jul. 5, 2017; www.youtube.com/watch?v=S6nv0IIYZD4; pp. 1-27.*
(Continued)

*Primary Examiner* — Maikhanh Nguyen
(74) *Attorney, Agent, or Firm* — GrowIP Law Group LLC

(57) ABSTRACT

A computer implemented method includes displaying a design creation user interface operable by a user to create or edit a design document comprising a plurality of design elements. Data identifying each of the plurality of design elements and data identifying attributes of the plurality of design elements is maintained. A processor determines, based on the attributes, that at least one rule with an associated diagnostic is invoked and indicia is displayed corresponding to the diagnostic associated with the at least one rule.

16 Claims, 14 Drawing Sheets

(51) Int. Cl.
    *G06F 40/109*     (2020.01)
    *G06F 40/14*     (2020.01)
    *G06F 40/166*     (2020.01)

(58) Field of Classification Search
    USPC .................................................... 715/255
    See application file for complete search history.

(56) References Cited

U.S. PATENT DOCUMENTS

| | | | |
|---|---|---|---|
| 2008/0244740 A1* | 10/2008 | Hicks | G06F 40/166 715/239 |
| 2009/0055460 A1* | 2/2009 | Hicks | G06F 16/958 709/201 |
| 2010/0180213 A1* | 7/2010 | Karageorgos | G06F 16/93 715/764 |
| 2011/0296288 A1* | 12/2011 | Gorbaty | G06F 40/194 715/205 |
| 2014/0189594 A1* | 7/2014 | Hashiba | G06F 3/0483 715/835 |
| 2016/0041957 A1 | 2/2016 | Finsterwald et al. | |
| 2017/0323061 A1* | 11/2017 | D'Souza | G16H 40/63 |
| 2019/0065038 A1* | 2/2019 | Wilner | G06F 40/166 |
| 2019/0325626 A1 | 10/2019 | Tao | |
| 2019/0392866 A1* | 12/2019 | Yoon | G11B 27/28 |
| 2020/0019594 A1* | 1/2020 | Kerr | G06F 40/106 |
| 2020/0097619 A1 | 3/2020 | Bowen | |

OTHER PUBLICATIONS

Grotta et al., Adobe Photoshop Elements 13 Review: An App to Grow Your Skills; Jan. 30, 2015; tomsguide.com; pp. 1-30.*

"Validate your designs against your defined design guidelines, within seconds A step towards automating design testing," Saransh Solanki, (Viewed on internet on May 21, 2021), URL: https://uxdesign.cc/sketch-lint-2f292ef87084, published on Mar. 15, 2019 (pp. 1-8).

Written Opinion of the International Search Authority for PCT/AU2021/050364 dated May 28, 2021 (pp. 1-9).

Introducing Roller—Design Linter for Figma, Brendan Mahony, (Viewed on internet on May 21, 2021), URL: https://blog.prototypr.io/introducing-roller-design-linter-for-figma-16340f47e4e5, published on Sep. 11, 2019 (pp. 1-10).

* cited by examiner

SYSTEM AND METHOD FOR DOCUMENT ANALYSIS OF A DESIGN DOCUMENT HAVING DESIGN ELEMENTS

CROSS-REFERENCE TO RELATED APPLICATIONS

This application is a U.S. National Stage Application that claims the benefit of the filing date of International PCT Application No. PCT/AU2021/050364, filed on Apr. 23, 2021, that claims priority to Australian Patent Application No. 2020901276, filed Apr. 23, 2020, that are hereby incorporated by reference in their entirety.

FIELD

The present disclosure is directed to systems and methods for analysing a document, in particular a design document.

BACKGROUND

Various computer implemented tools for creating and publishing designs exist. One example is the tool provided by Canva® Pty Ltd. Generally speaking, in order to create designs, such tools allow users to add design elements to a page. Design elements may be accessed and added from one or more element libraries and/or drawn by using drawing tools.

Creating designs using computer implemented tools is typically a task involving significant skill and effort by the user. The cognitive burden on a user in creating a design can be significant. The design and features incorporated into the computer implemented tools can heavily influence the cognitive burden on the user. For example a functionally well designed human-computer interface can substantially reduce the burden on users.

Whilst there exist some tools for analysing textual documents to identify possible errors or options for improvement, for example spelling and grammar checkers integrated into word processors, there are limited tools for completing a similar analysis of a design. Integrating an analysis engine or function into design software presents different problems to integrating spelling and grammar checks into word processors and to date there appear to be limited acceptable solutions.

One option provided in a design creation and publishing tool that may help avoid design error, or the creation of otherwise undesired designs, is to restrict the design options available to users of the tool. For example, a tool provided by Canva® Pty Ltd enables restriction of access to only authorised fonts, colours, images and other assets. These restrictions may avoid, for example, the use by members of an organisation of colours that are viewed by the organisation as inconsistent with its brand. In particular, less reliance is had on the skill and knowledge of the user to avoid such an inconsistency. However, the restrictions may also stifle creativity, resulting in designs that may otherwise be viewed as favourable not being created and/or creating an unwanted impediment to the more highly skilled user.

Background information described in this specification is background information known to the inventors. Reference to this information as background information is not an acknowledgment or suggestion that this background information is prior art or is common general knowledge to a person of ordinary skill in the art.

Figure 1:
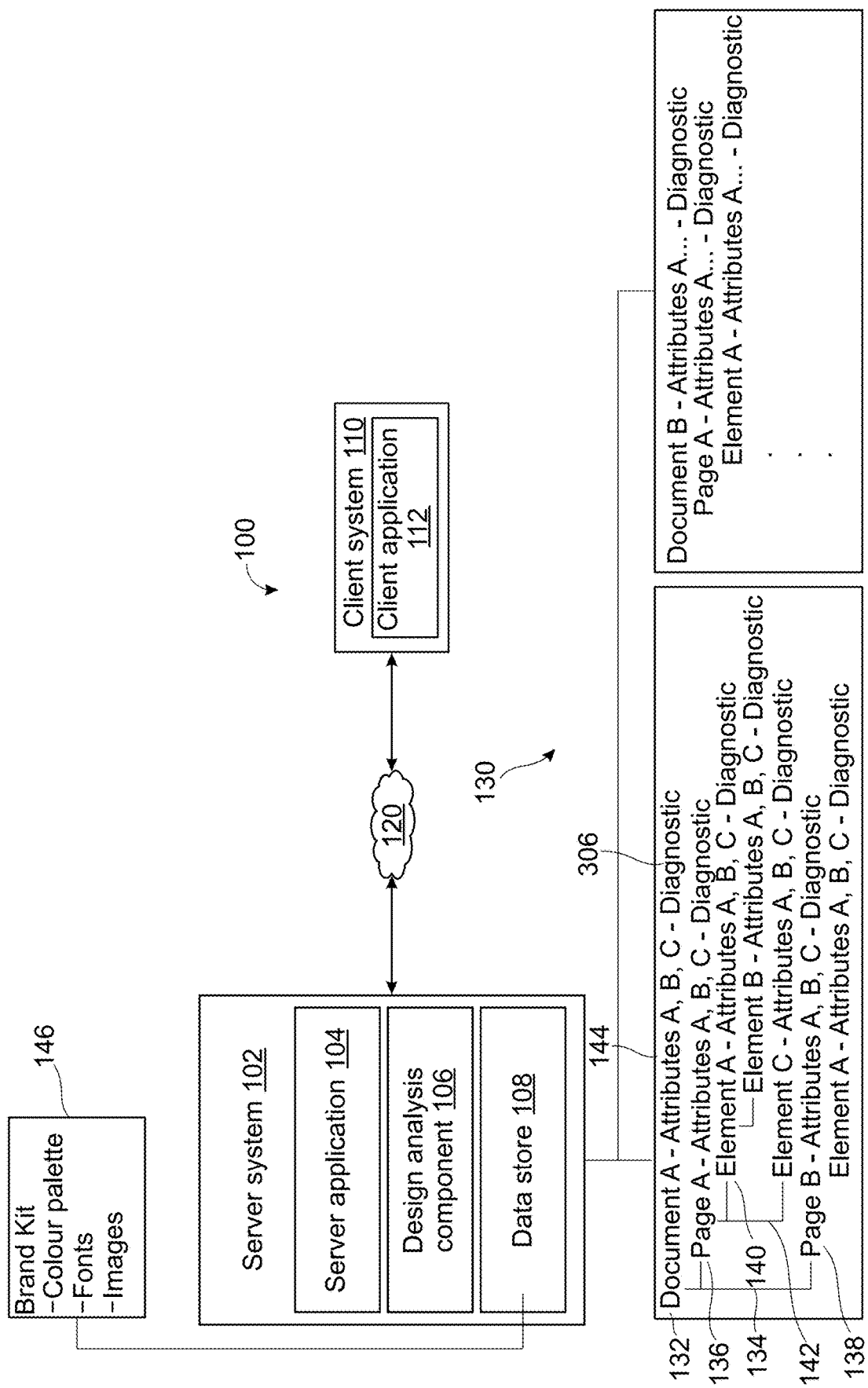
FIG. 1 is a block diagram illustrating an example environment in which features of the present disclosure can be implemented.

While the invention as claimed is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION OF EMBODIMENTS

In the following description numerous specific details are set forth in order to provide a thorough understanding of the claimed invention. It will be apparent, however, that the claimed invention may be practiced without these specific details. In some instances, well-known structures and devices are shown in block diagram form in order to avoid unnecessary obscuring.

The embodiments described herein refer to designs, design pages and design elements.

"Designs": A design is an arrangement of a plurality of design elements within a document of one or more design pages.

"Design pages": A design page (page for short) defines an area that is intended to be viewed as a discrete whole. A page may also be referred to as a canvas.

A page has certain page attributes, for example a page identifier (typically assigned by the design tool and unique at least for the design in question), a page width, and a page height. The width and height of a page define both its size and aspect ratio.

A page also has an associated coordinate system (typically a common coordinate system provided by the design tool for all pages). By way of example, the page coordinate system may be a Cartesian coordinate system defining a horizontal (x) axis and vertical (y) axis. The units of the coordinate system can be any appropriate units, for example pixels, millimetres, centimetres, inches, or an alternative unit. The origin of the coordinate system ($x=0$, $y=0$), and direction in which x and y increase/decrease, may be defined as desired. For example, the origin ($x=0$, $y=0$) for a page may be defined as the top left corner of the page, with x-axis coordinates increasing from left to right and y-axis coordinates increasing from top to bottom.

In the embodiments described herein, a page is associated with a list of elements. The association may be, for example, recorded as an association of the page identifier with the list of elements. A page's element list is used to record all design elements that have been added to the page—e.g. a list of element identifiers.

"Design elements": Design elements (elements for short) are objects that are added to a page to create a visual appearance for the design.

Elements may be copied or imported from one or more element libraries (e.g. libraries of images, animations, videos, etc.). Alternatively, elements may be drawn or created using one or more design tools, for example a text tool, a line tool, a rectangle tool, an ellipse tool, a curve tool, a freehand tool, and/or other design tools or combinations thereof.

Once an element is added to a page it is given an element identifier (typically automatically assigned by the design tool). The element identifier is unique at least within the page that the element has been added to. A given design element has associated element attributes. The particular element attributes that are or can be associated with a given element may depend on the type of element in question. By way of example, however, element attributes may include those shown in Table 1.

TABLE 1

Design element attributes

| Element attribute | Description |
| --- | --- |
| Element identifier | Identifier for the element (unique at least within the page the element has been added to). |
| Element origin | For example, x and y coordinates defining an origin point of the element. |
| Element width | A value defining the width of the element. |
| Element height | A value defining the height of the element. |
| Element rotation | A value defining a degree of rotation of the element, e.g. a value x such that −180 degrees <= x <= +180 degrees. |
| Element colour | An identifier of the colour that the element appears in, for example the colour of text or of lines used to form a picture |
| Font size | A value defining the size of text of an element |
| Element fill | Data defining a fill of a rectangular element- for example a colour or an identifier of a library element image, video, or other media file used to fill the element. |
| Element transparency | Data defining any transparency applied to the element. |

Additional (and/or alternative) element attributes are possible.

The design tool may define the origin point for elements to be any defined (consistent) point. For example, the origin point may be defined as the top left corner of an element—i.e. x=the leftmost x coordinate of the element and y=the topmost y coordinate of the element. Alternative element origin points may however be used—e.g. any other corner of the element, a centre point of the element, or any other defined origin point.

Element x/y coordinates and widths/heights are typically in the units of the coordinate system for the page the element is positioned on.

Any appropriate value may be used for rotation (e.g. degrees or radians). Rotation may be about a predefined constant pivot point (e.g. a centre point of the element (e.g. (((origin×coordinate+width)/2), ((origin y coordinate+height)/2)), the origin, a corner of the element, or an alternative predefined constant pivot point. Alternatively, rotation may be about a pivot point that is defined for each individual element, either by a user or automatically (e.g. a pair of pivot coordinates (pivot x, pivot y)).

As noted above, a given page is associated with a list of elements that defines the elements that have been added to that page. When an element is added to the page the element (or element identifier) is added to the page's element list.

Absent explicit user manipulation, elements are added to the page's element list in the order they are added to the page. In some implementations, the first item in the page's element list (i.e. list index 0) will be a background element. In this case, the first element added to the page by a user becomes the second item in the page's element list (index 1 of the list), the next element added becomes the third item in the page's element list (index 2 of the list) and so forth. In the case of a template, several elements may have already been added to the page, which therefore have pre-assigned locations in the list.

Constructing a page's element list in this manner means that an element's position (index) in the element list also defines its depth or z-index in the page: i.e. an element at index n is behind an element at index n+1 and in front of an element at index n−1. Where a given element is in front of one or more other elements it can, depending on position/size/rotation/transparency, occlude or partially occlude any/all elements it is in front of. I.e. an element at index n is in front of all elements with an index of <n.

Design tools typically provide mechanisms for a user to manually adjust an element's depth, for example by bringing forward, sending backwards, bringing to front, sending to back. If such adjustments are made, corresponding changes are made to the order of the page's element list.

An element in a page may have one or more child elements. For example text may be a child element of a text box. An element may therefore also include a child list. The element list may therefore be viewed as having a tree structure including branches.

Also as noted above, a page may be part of a document that contains one or more other pages. In a tree structure organisation, the document may therefore be a root node, which branches to a page list (one node per page) and each page may branch into an element list (one node per element) and so forth for any child elements.

FIG. 1 depicts one example of a networked environment 100 in which the various operations and techniques described herein can be performed.

Networked environment 100 includes a design server system 102 and a client system 110 that are interconnected via a communications network 120 (e.g. the Internet). While a single client system 110 is illustrated and described, server system 102 will typically serve multiple client systems.

The design server system 102 includes various functional components, which operate together to provide server-side functionality.

One component of server system 102 is a server application 104. The server application 104 is executed by a computer processing system to configure that system to provide front-end server-side functionality to one or more corresponding client applications (e.g. client application 112 described below). The server-side functionality includes operations such as user account management, login, and design specific functions—for example creating, saving, publishing, and sharing of designs.

To provide the server-side functionality, the server application 104 comprises one or more application programs, libraries, APIs or other software elements. For example, where the client application 112 is a web browser, the server application 104 will be a web server such as Apache®, IIS, nginx®, GWS, or an alternative web server. Where the client application 112 is a specific application, the server application 104 will be an application server configured specifically to interact with that client application 112. Server system 102 may be provided with both web server and application server modules.

In the present example, server system 102 also includes a design analysis component 106. As described below, the design analysis component 106 performs (or configures the server application 104 to perform) processing to analyse documents, pages and/or design elements comprising a design. The design analysis component 106 may be a software module, such as an add-on or plug-in that operates in conjunction with the server application 104, to expand the functionality thereof. In alternative embodiments, however, the functionality provided by the design analysis component 106 may be natively provided by the server application 104 (i.e. the server application 104 itself has instructions and data which, when executed, cause the server application 104 to perform part or all of the analysis functionality described herein).

In the present example, server system 102 also includes a data store 108 which is used to store various data required by the server system 102 in the course of its operations. Such data may include, for example, user account data, design template data, design element data, and data in respect of designs that have been created by users. In particular, the data may include page identifiers and attributes and design element identifiers and attributes, as described above.

FIG. 1 diagrammatically represents example data included in the data store 108. The data store 108 may store data 130 associated with a first document called Document A and a second document called Document B. The data store 108 includes data defining a document identifier 132 of Document A, page linking data 134 associating the document identifier 132 with one or more pages, in this example including associations with a page identifier 136 of a first page called Page A and a page identifier 138 of a second page called Page B. The data store 108 also includes data defining element identifiers 140, including data defining element identifiers of three design elements included in Page A, called Element A, B and C (only the element identifier of Element A is shown with reference 140 in FIG. 1). Element linking data 142 associates the Elements A, B and C with Page A and defines any association with each other, including for example that Element B is included within Element A. Data defining attributes 144 of each element is also stored in the data store, associated with their respective element. Similarly, each page and/or the document may include attributes 144. The attributes are represented as "Attributes A, B, C . . . " in respect of Document A. The data 130 includes document, page and element data of Document B in the same manner as for Document A.

The data 130 is generated and caused to be stored in the data store 108 by the server system 102, for example by the server application 104 or by the design analysis component 106. For example, the server application 104 may be configured to receive user input in relation to a page that adds an element to the page and in response to the user input, create a new node in the data structure with an element identifier, generate linkage data associating the element identifier with the page and generate attribute data defining the attributes of the added element. Alternatively, the design analysis component 106 may poll the data stored by the server application 104 for a change to a design to add a design element, and generate the data responsive to the polling detecting the change. In some embodiments the server system 102 generates the data 130 substantially in real time or in other words responsive to each material change to a design as the change is made by the user.

The data store 108 may also include one or more brand kits 146. Each brand kit may be associated with one or more users or groups of users. For example, the users of an organisation may have access to a brand kit for that organisation, with access being authorised by the users providing credentials to the server system 102. A brand kit 146 may include data defining a colour palette for use in organisation designs, fonts for use in organisation designs and/or images (e.g. logos, pictures, photos and the like) for use in organisation designs.

While one data store 108 is depicted, server system 102 may include/make use of multiple separate data stores—e.g. a user data store (storing user account details), one or more element library data stores (storing elements that users can add to designs being created); a template data store (storing templates that users can use to create designs); a design data store (storing data in respect of designs that have been created); a brand kit data store and/or other data stores.

In order to provide server side functionality to clients, server system 102 will typically include additional functional components to those illustrated and described. As one example, server system 102 will typically include one or more firewalls (and/or other network security components) and load balancers (for managing access to the server application 104).

The server system 102 components have been described as functional components, and may be implemented by hardware, software (data and computer readable instructions which are stored in memory and executed by one or more computer processing systems), and/or a combination of hardware and software.

The precise hardware architecture of server system 102 will vary depending on implementation, however it may well include multiple computer processing systems (e.g. server computers) which communicate with one another either directly or via one or more networks, e.g. one or more LANS, WANs, or other networks (with a secure logical overlay, such as a VPN, if required).

For example, server application 104 and design analysis component 106 may run on a single dedicated server computer and data store 108 may run on a separate server computer (with access to appropriate data storage resources). As an alternative example, server system 102 may be a cloud computing system and configured to commission/decommission resources based on user demand 104. In this case there may be multiple server computers (nodes) running multiple server applications 104 which service clients via a load balancer.

Client system 110 hosts a client application 112 which, when executed by the client system 110, configures the client system 110 to provide client-side functionality for/interact with, the server application 104 of the server system 102. Via the client application 112 a user can interact with the server application 104 in order to perform various operations such as creating, editing, saving, retrieving/accessing, publishing, and sharing designs.

Client application 112 may be a web browser application (such as Chrome®, Safari®, Internet Explorer®, Opera®, or an alternative web browser application) which accesses the server application 104 via an appropriate uniform resource locator (URL) and communicates with server application 104 via general world-wide-web protocols (e.g. http, https, ftp). Alternatively, the client application 112 may be a specific application programmed to communicate with server application 104 using defined application programming interface (API) calls.

Client system 110 may be any computer processing system which is configured (or is configurable) by hardware and/or software to offer client-side functionality. By way of example, client system 110 may be a desktop computer, a laptop computer, a netbook computer, a tablet computing device, a mobile/smart phone device, a personal digital assistant, or an alternative computer processing system.

Although not illustrated in FIG. 1, client system 110 will typically have additional applications installed thereon, for example at least an operating system application such as a Microsoft® Windows® operating system, an Apple® macOS® operating system, an Apple® iOS® operating system, an Android® operating system, a Unix® or Linux® operating system, or an alternative operating system.

The architecture described above and illustrated in FIG. 1 is provided by way of example only. Many variations are possible. For example, while the design analysis component 106 has been described and illustrated as being part of/installed at the server system 102, the functionality provided by the server application 104 and/or design analysis component 106 could alternatively be provided by a client system 110 (for example as an add-on or extension to client application 112, a separate, stand-alone application that communicates with client application 112, or a native part of client application 112). Further alternatively, the functionality provided by the design analysis component 106 could be performed by a client application (e.g. 112) and server application (e.g. 104) operating in conjunction. As a further example, the design analysis component 106 could be provided as an entirely separate service—e.g. running on a separate server system to server system 102 and communicating with client application 112 (and/or server system 102) as required to perform the element grouping functionality described herein. As yet a further example, a content creation system including a design analysis component 106 could be provided in a self-contained application that is installed and runs solely on a client system without any need of a server application.

The features and techniques described herein are implemented using one or more computer processing systems.

For example, in networked environment 100 described above, client system 110 is a computer processing system (for example a personal computer, tablet/phone device, or other computer processing system). Similarly, the various functional components of server system 102 are implemented using one or more computer processing systems (e.g. server computers or other computer processing systems).

Figure 2:
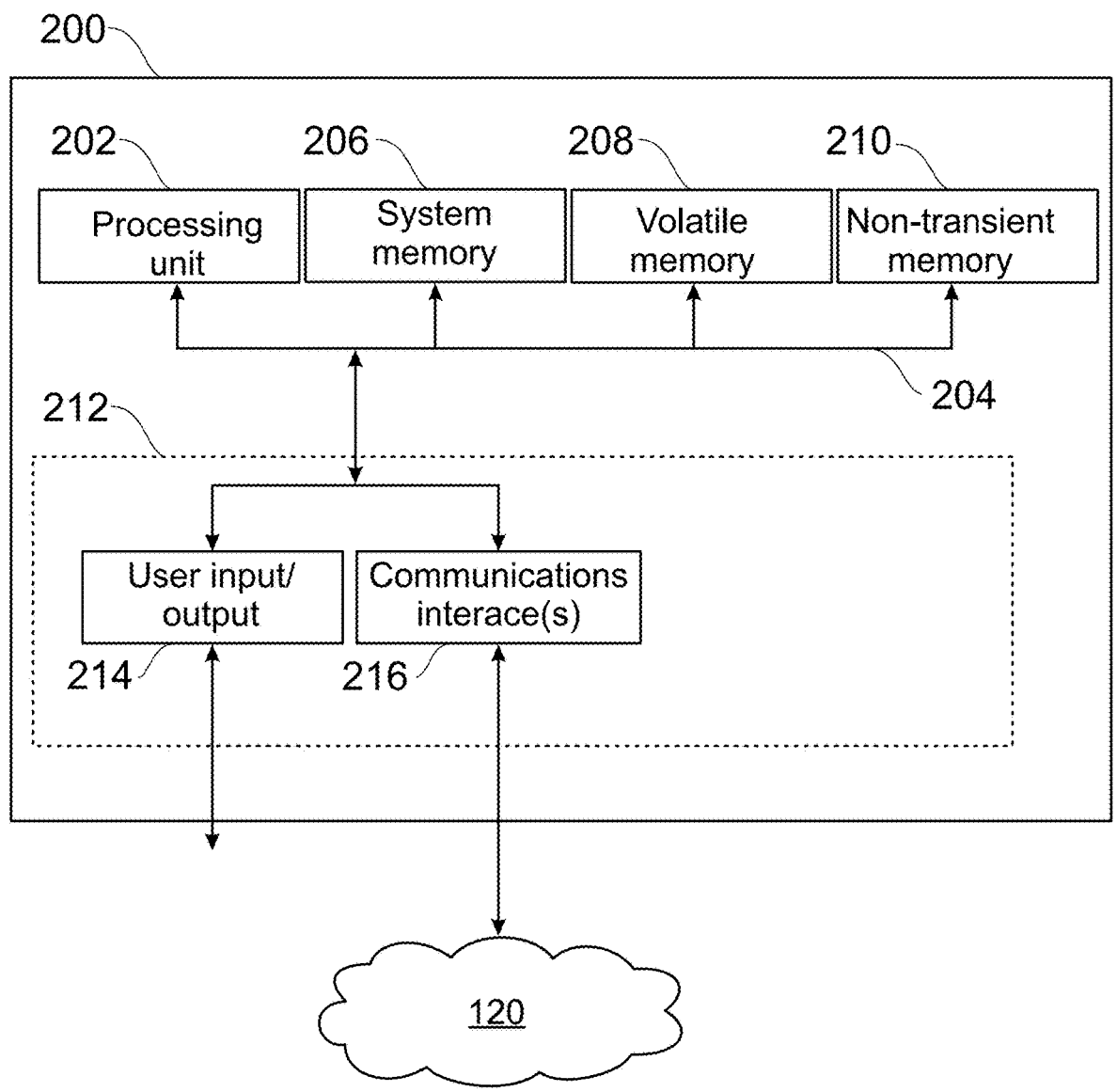
FIG. 2 is an example computer processing system configurable to perform various features described herein.

FIG. 2 provides a block diagram of a computer processing system 200 configurable to implement embodiments and/or features described herein. System 200 is a general purpose computer processing system. It will be appreciated that FIG. 2 does not illustrate all functional or physical components of a computer processing system. For example, no power supply or power supply interface has been depicted, however system 200 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 200 includes at least one processing unit 202. The processing unit 202 may be a single computer processing device (e.g. a central processing unit, graphics processing unit, or other computational device), or may include a plurality of computer processing devices. In some instances, where a computer processing system 200 is described as performing an operation or function all processing required to perform that operation or function will be performed by processing unit 202. In other instances, processing required to perform that operation or function may also be performed by remote processing devices accessible to and useable by (either in a shared or dedicated manner) system 200.

Through a communications bus 204 the processing unit 202 is in data communication with a one or more machine readable storage (memory) devices which store instructions and/or data for controlling operation of the processing system 200. In this example system 200 includes a system memory 206 (e.g. a BIOS), volatile memory 208 (e.g. random access memory such as one or more DRAM modules), and non-volatile memory 210 (e.g. one or more hard disk or solid state drives).

System 200 also includes one or more interfaces, indicated generally by 212, via which system 200 interfaces with various devices and/or networks. Generally speaking, other devices may be integral with system 200, or may be separate. Where a device is separate from system 200, connection between the device and system 200 may be via wired or wireless hardware and communication protocols, and may be a direct or an indirect (e.g. networked) connection.

Wired connection with other devices/networks may be by any appropriate standard or proprietary hardware and connectivity protocols. For example, system 200 may be configured for wired connection with other devices/communications networks by one or more of: USB; FireWire®, eSATA; Thunderbolt®; Ethernet; OS/2; Parallel; Serial; HDMI; DVI; VGA; SCSI; AudioPort. Other wired connections are possible.

Wireless connection with other devices/networks may similarly be by any appropriate standard or proprietary hardware and communications protocols. For example, system 200 may be configured for wireless connection with other devices/communications networks using one or more of: infrared; BlueTooth®, WiFi; near field communications (NFC); Global System for Mobile Communications (GSM), Enhanced Data GSM Environment (EDGE), long term evolution (LTE), wideband code division multiple access (W-CDMA), code division multiple access (CDMA). Other wireless connections are possible.

Generally speaking, and depending on the particular system in question, devices to which system 200 connects—whether by wired or wireless means—include one or more input devices to allow data to be input into/received by system 200 for processing by the processing unit 202, and one or more output device to allow data to be output by system 200. Example devices are described below, however it will be appreciated that not all computer processing systems will include all mentioned devices, and that additional and alternative devices to those mentioned may well be used.

For example, system 200 may include or connect to one or more input devices by which information/data is input into (received by) system 200. Such input devices may include keyboards, mice, trackpads, microphones, accelerometers, proximity sensors, GPS devices and the like. System 200 may also include or connect to one or more output devices controlled by system 200 to output information. Such output devices may include devices such as a CRT displays, LCD displays, LED displays, plasma displays, touch screen displays, speakers, vibration modules, LEDs/other lights, and such like. System 200 may also include or connect to devices which may act as both input and output devices, for example memory devices (hard drives, solid state drives, disk drives, compact flash cards, SD cards and the like) which system 200 can read data from and/or write data to, and touch screen displays which can both display (output) data and receive touch signals (input).

System 200 also includes one or more communications interfaces 216 for communication with a network, such as network 180 of environment 100 (and/or a local network within the server system 102 or OS 120). Via the communications interface(s) 216 system 200 can communicate data to and receive data from networked devices, which may themselves be other computer processing systems.

System 200 may be any suitable computer processing system, for example, a server computer system, a desktop computer, a laptop computer, a netbook computer, a tablet computing device, a mobile/smart phone, a personal digital assistant, or an alternative computer processing system.

System 200 stores or has access to computer applications (also referred to as software or programs)—i.e. computer readable instructions and data which, when executed by the processing unit 202, configure system 200 to receive, process, and output data. Instructions and data can be stored on non-transient machine readable medium accessible to system 200. For example, instructions and data may be stored on non-transient memory 210. Instructions and data may be transmitted to/received by system 200 via a data signal in a transmission channel enabled (for example) by a wired or wireless network connection over interface such as 212.

Applications accessible to system 200 will typically include an operating system application such as Microsoft® Windows®, Apple® macOS®, Apple® iOS®, Android®, Unix®, or Linux®.

System 200 also stores or has access to applications which, when executed by the processing unit 202, configure system 200 to perform various computer-implemented processing operations described herein. For example, and referring to the networked environment of FIG. 1 above: client system 110 includes a client application 112 which configures the client system 110 to perform the operations described herein.

In some cases, part or all of a given computer-implemented method will be performed by system 200 itself, while in other cases processing may be performed by other devices in data communication with system 200.

Figure 3:
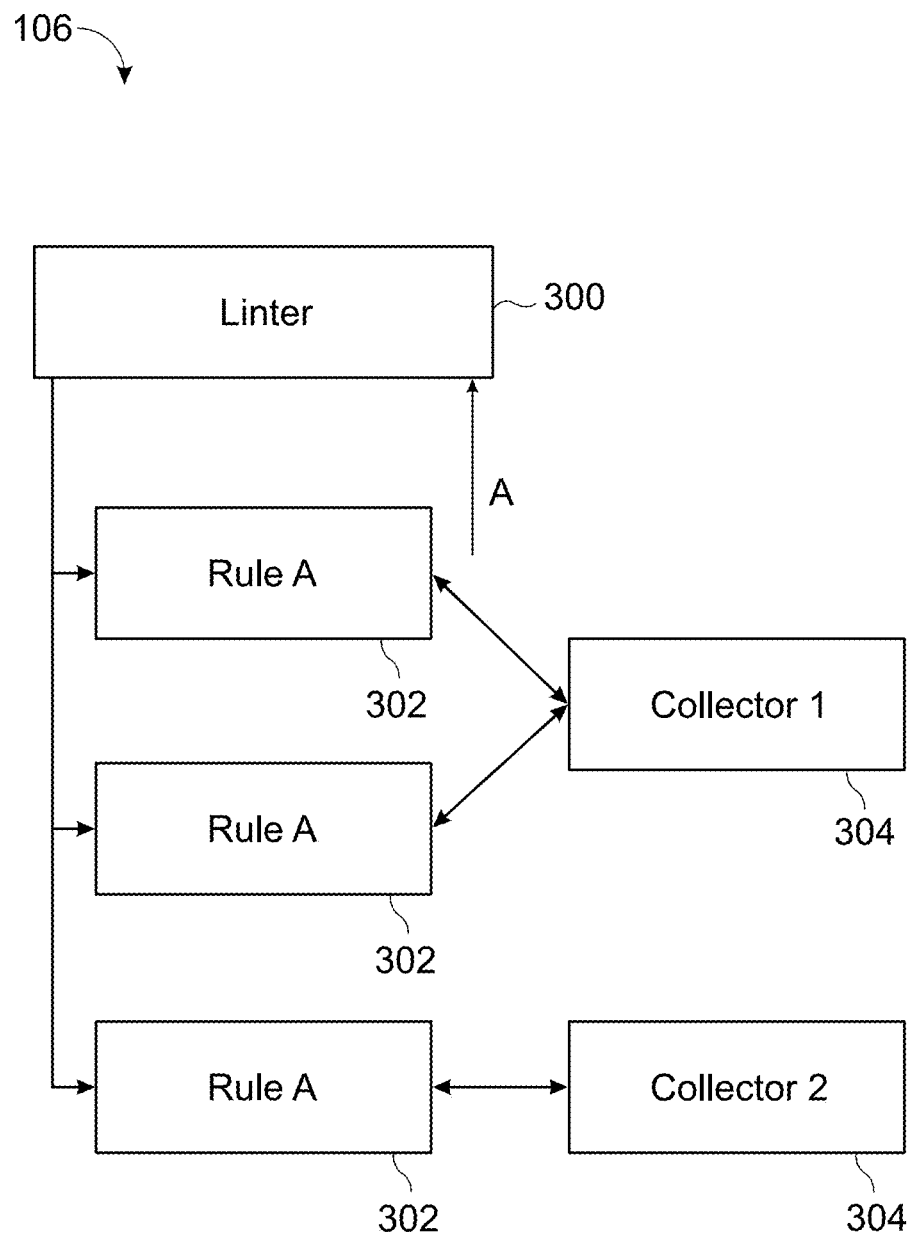
FIG. 3 shows a block diagram representation of a design analysis component.

FIG. 3 shows a block diagram representation of functions of design analysis component 106. The analysis is performed by a linter 300. The design analysis component 106 defines several rules 302, called Rule A, Rule B and Rule C in FIG. 3. The rules define errors or other events that trigger a diagnostic. Examples of possible rules are described later herein. Each rule is associated with at least one collector 304. In the example, Rules A and B are associated with Collector 1 and Rule C is associated with Collector 2. The collectors 304 extract from the data 130 attributes for their associated rule or rules. The linter 300 analyses data 130 by applying one or more of the rules 302 to the data collected by the collector(s) 304 associated with the one or more rules 302 (as indicated by arrow A) and generates results or diagnostics 306 based on the analysis. In some embodiments the diagnostics 306 are stored in the data store 108, associated with the node of the relevant document, page or element identifier. For example, referring to FIG. 1, a set of one or more diagnostics may be stored associated with Document A, a set of one or more diagnostics stored associated with Page A, a set of one or more diagnostics stored associated with Element A and so forth. In other embodiments the diagnostics 306 are not stored directly associated with the pages of the data defining the documents that are created and edited. Instead, the design analysis component 106 creates its own data for the documents in data store 108 which may have the same or similar structure to data 130. A diagnostic 306 may indicate that the linter 300 has revealed no issues for user attention or action or may indicate one or more issues for user attention or action. Alternatively the absence of a diagnostic 306 in relation to a node of the relevant document may indicate that the linter 300 has revealed no issues for user attention or action.

In some embodiments the rules have a hierarchy or priority relative to each other. For example, if both rule A and rule B are detected or invoked in relation to Element A, the design analysis component may be configured such that rule B takes precedence over rule A. The precedence may result, for example in only the diagnostic related to rule B being displayed to the user, or the diagnostic related to rule B being displayed before the diagnostic for rule A. If the diagnostic is associated with an action, then the action of a higher priority action may be suggested or actioned either alone or first, following which the linter 300 may run again in relation to the change, in case the lower priority rule no longer applies.

A diagnostic 306 may include or identify a message for the user. For example, in the instance that a rule 302 applied by the linter 300 checks whether an attribute of a document of a background colour is a colour within the colour palette of the brand kit 146, a message for the user may be "Use a brand colour instead". A diagnostic 306 may also include or identify an action performable by the server system 102. For example, the design analysis component 106 or server application 104 may include instructions to display a colour palette corresponding to the colour palette of the brand kit responsive to a diagnostic 306 indicating use of a colour not in the brand kit, thereby allowing the user to change the background colour of the document by selecting a colour from the displayed brand kit colour palette. The design analysis component 106 may cause the server application 104 to select the design element to which the diagnostic relates. For example, a user selection in relation to the example diagnostic 306 that notifies that the background colour is not within the brand kit 146 may cause the design analysis component 106 to instruct the server application 104 to both select the background to which the diagnostic relates and to display the colour palette. The user then only needs to perform the action of selecting a colour for the background, without first locating and selecting the background.

The diagnostic may include various information or variables, which may be provided to the user and/or acted on by the system. For example, responsive to the information, the system may categorise diagnostics, determine what to display in the user interface and the information may also inform the rule hierarchy and inform suggestions or fixes to be applied. For example, a diagnostic may include one or more of:

- An identifier of the violating attribute(s) e.g. the hex code of the off-brand colours detected, the position coordinate detected in the page margin etc;
- An identifier of the violating lintable e.g. information indicating whether the diagnostic was detected at an element, page or document level and/or information indicating the specific element/page in violation of the rule;
- An identifier of whether the diagnostic is a single diagnostic (pertaining to a single lintable e.g. off-brand colour), or a group diagnostic (involving multiple or conflicting elements e.g. consistent colours);

An identifier of a user interface element to display responsive to the diagnostic e.g. a title, message and/or thumbnail to display; and An identifier or one or more suggested attributes e.g. an alternate colour hex code that, if applied to this element, would resolve the diagnostic.

In some embodiments the server application 104 is configured to prevent an action in relation to a document until actions in relation to the diagnostics indicating issues have been addressed. For example the function of publishing a document to a social media platform may be inoperative until the user has provided input addressing each issue identified by the diagnostics for the document. The server application 104 may display a message indicating why the publishing function is inoperative if attempted to be invoked by the user and may display a user interface for addressing the issues identified by the diagnostics. An example user interface is described below.

Figure 4:
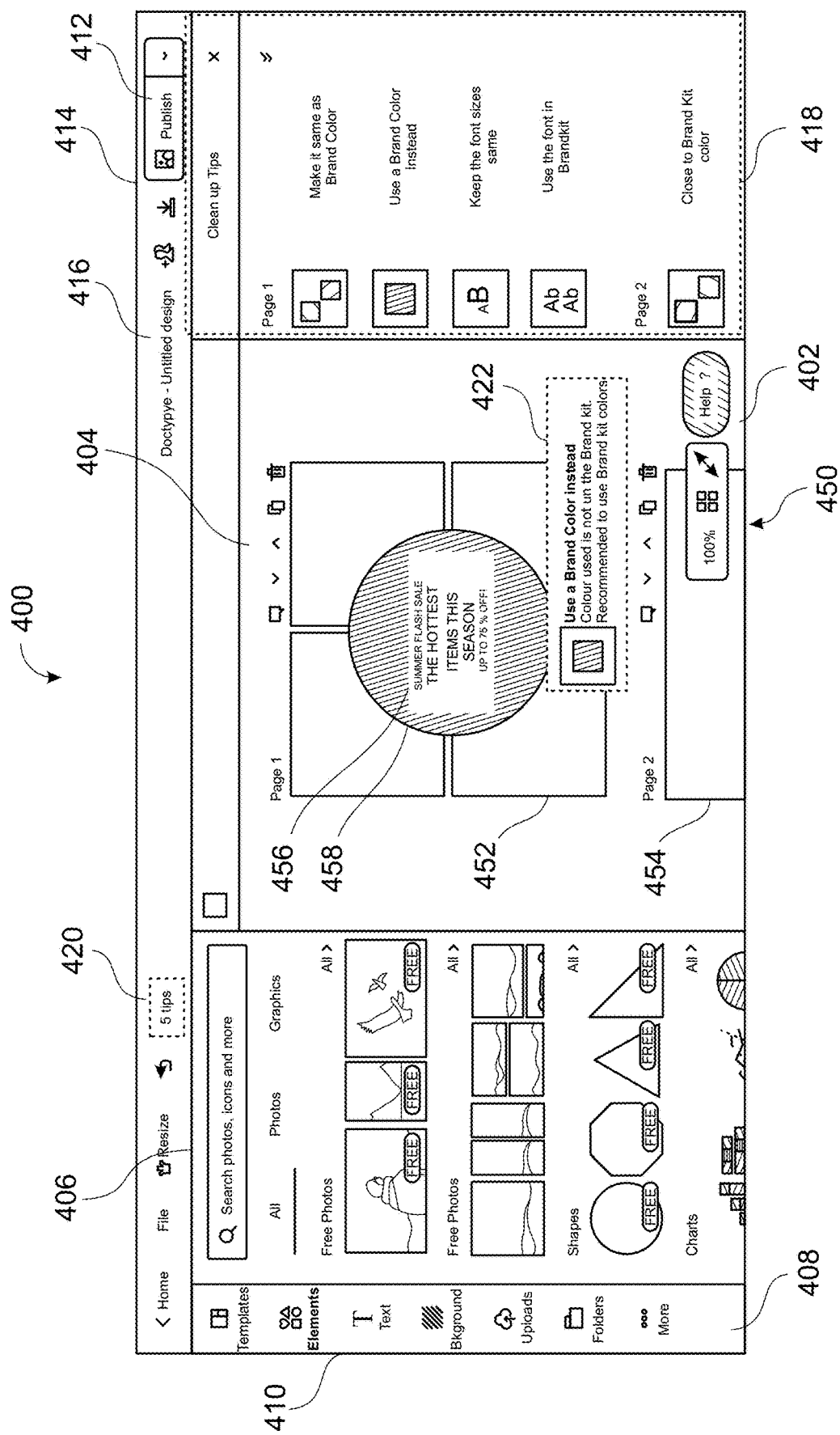
FIG. 4 to FIG. 6 provide examples of design creation user interfaces.

FIG. 4 shows a design creation user interface 400 which is displayed by a client system 102 (the client system 102 configured to do so by client application 104). Via interface 400 a user can create a design document that comprises one or more pages and (inter alia) add elements to the page and edit elements on the page.

The design creation user interface 400 includes a design presentation region 402, in which the client system 102 displays a design document on which a user is working. The design document 450 is stored in data store 108 and includes in this example at least two pages, with the first page 452 (Page 1) fully shown in region 402 and the second page 454 (Page 2) partially shown, below the first page. The user may operate the client system 102 to scroll the display in region 402 to reveal the remainder of page 2 and to scroll to any subsequent pages. Referring to the first page 452, the page includes several design elements, including a text design element 456 "The Hottest Items This Season" and a circle design element 458 within which the text design element 456 is located. Both the text design element 456 and the circle design element 458 have attributes, including attributes reflecting the colour(s), font(s) of the text, the colour(s) of the circle and the position of the element within the page. These attributes are stored in data store 108 associated with the design document 450. The association may either be direct and/or indirect, via an association with the first page 452.

The design creation user interface 400 includes various user interface elements operable by the user to create and edit design documents. In the example of FIG. 4, these include icons 404 for performing navigation actions or actions on the pages within design presentation region 402, a search window 406 for locating content for use as a design element to add to the document, for example content within data store 108 and/or content located within a third party system, and an element editing panel 408 including icons that when selected cause editing of, or initiate a process for editing, the design elements. For example selection of the text icon 410 within element editing panel 408 may cause a text selection window to be displayed, from which the user can select one or more of a text font, text size, text colour or other text attributes for text to add to the design document. As a new page or a new design element is added and as an existing page or design element is edited or removed, the attributes for the relevant page and design element in data store 108 are added, updated or removed by the server system 102. Other functional and informative icons may be included in the design creation user interface 400, including for example a publish icon 412 to initiate a process to publish the design document, for example to a social media platform, a download icon 414 to initiate a process to download the design document onto local storage of the client system 110 and file name icon 416 displaying the name of the design document.

In some embodiments, the design creation user interface 400 also includes a diagnostic display region 418. In the example shown, the diagnostic display region 418 is displayed while the design creation user interface 400 is displaying a design document, and the diagnostic display region 418 displays diagnostics relating to the displayed design document. In particular, the diagnostic display region 418 displays diagnostics generated by the linter 300 based on the rules 302 and on the attributes associated with the displayed document collected by the collectors 304. The user of the design creation user interface 400 can therefore simultaneously view both a design document and the diagnostics for the design document. Also in the example shown, the diagnostic display region 418 is displayed while one or more of the user interface elements operable by the user to create and edit design documents are displayed. The user of the design creation user interface 400 can therefore view the diagnostics for the design document whilst editing the design document.

In some embodiments the diagnostic display region 418 is displayed in the design creation user interface 400 responsive to a user action. In the example of FIG. 4, the user selection is of a diagnostic display icon 420. This process is represented in FIG. 4 by the bounding boxes around the diagnostic display icon 420 and diagnostic display region 418, which boxes need not form part of the design creation user interface 400. For example, another design creation user interface may include the diagnostic display icon 420 but not the diagnostic display region 418. The design presentation region 402 may extend across the region occupied by the diagnostic display region 418 in FIG. 4. Responsive to selection of the diagnostic display icon 420 the diagnostic display region 418 may appear, with the design presentation region 418 reducing in size to allow the simultaneous display of both. In some embodiments the design creation user interface 400 includes a notification that the linter 300 has generated diagnostics identifying one or more issues for notification or action. The notification therefore provides the user with a prompt to select the diagnostic display icon 420 (or perform another action causing the display of the diagnostic display region 418). In the example of FIG. 4, the notification is integral with the diagnostic display icon 420. In particular, the diagnostic display icon 420 is updated with a count of the number of issues identified by the diagnostics of the linter 300. In FIG. 4 the linter 300 has identified five issues and the notification is therefore "5 tips". The design creation user interface 400 may also include a selectable option to cease displaying or close the diagnostic display region 418, for example by selecting a displayed cross in the top right hand corner of the diagnostic display region 418. The design presentation region 418 may then increase in size to cover some or all of the area previously occupied by the diagnostic display region 418.

In the example of FIG. 4, the five diagnostics identified by the linter 300 for notification to the user are: a) "Make it same as Brand Color" with a message "Colour used is close to the brand colour. Make it the same"; b) "Use a Brand Color instead" with a message "Colour used is not the in Brand kit. Recommended to use the Brand kit colours"; c) "Keep the Font sizes same" with a message "Text elements have similar font size. Recommend keeping them the same";

d) "Use the font in Brandkit" with a message "The font you are using for this design is not in the Brand kit"; and e) Close to Brand Kit color" with a message "Colour used is close to the brand colour. Make it the same".

In the example of FIG. 4, the notices of the five diagnostics are grouped according to the page to which they relate. In some embodiments, as the user navigates within the design document, the diagnostic display region 418 automatically updates to show notices of diagnostics relating to the displayed part of the design document. For example, if the design document included a Page 3 and the user navigated to display only Page 3 in the design presentation region 402, then the notices of the five diagnostics a) to e) described above would cease to be displayed and instead notices of diagnostics relating to Page 3 (if any) displayed in the diagnostic display region 418. Similarly, the design creation user interface 400 may be configured to enable a user to navigate within the diagnostic display region 418, for example by selecting a displayed diagnostics and/or by scrolling through the list of displayed diagnostics, and in response to this navigation the design presentation region 402 may be automatically updated to show a page or portion of a page associated with the newly selected or newly displayed diagnostics and not showing a page or a portion of a page associated with unselected or no longer displayed diagnostics.

In some embodiments, in addition to or instead of displaying diagnostics in a diagnostic display region separate from a region displaying the design document, diagnostics are displayed with the design document. For example, a callout or dialog 422 with a diagnostic message may be displayed within design presentation region 402, associated with the design element to which the diagnostic relates. In embodiments in which the diagnostic display region 418 is not present, selection of a user interface element, for example the diagnostic display icon 420, may cause the design analysis component 106 to cycle through the diagnostics for a document. Such embodiments may assist to maximise the display area that can be utilised to present the design being created or edited.

Figure 5:
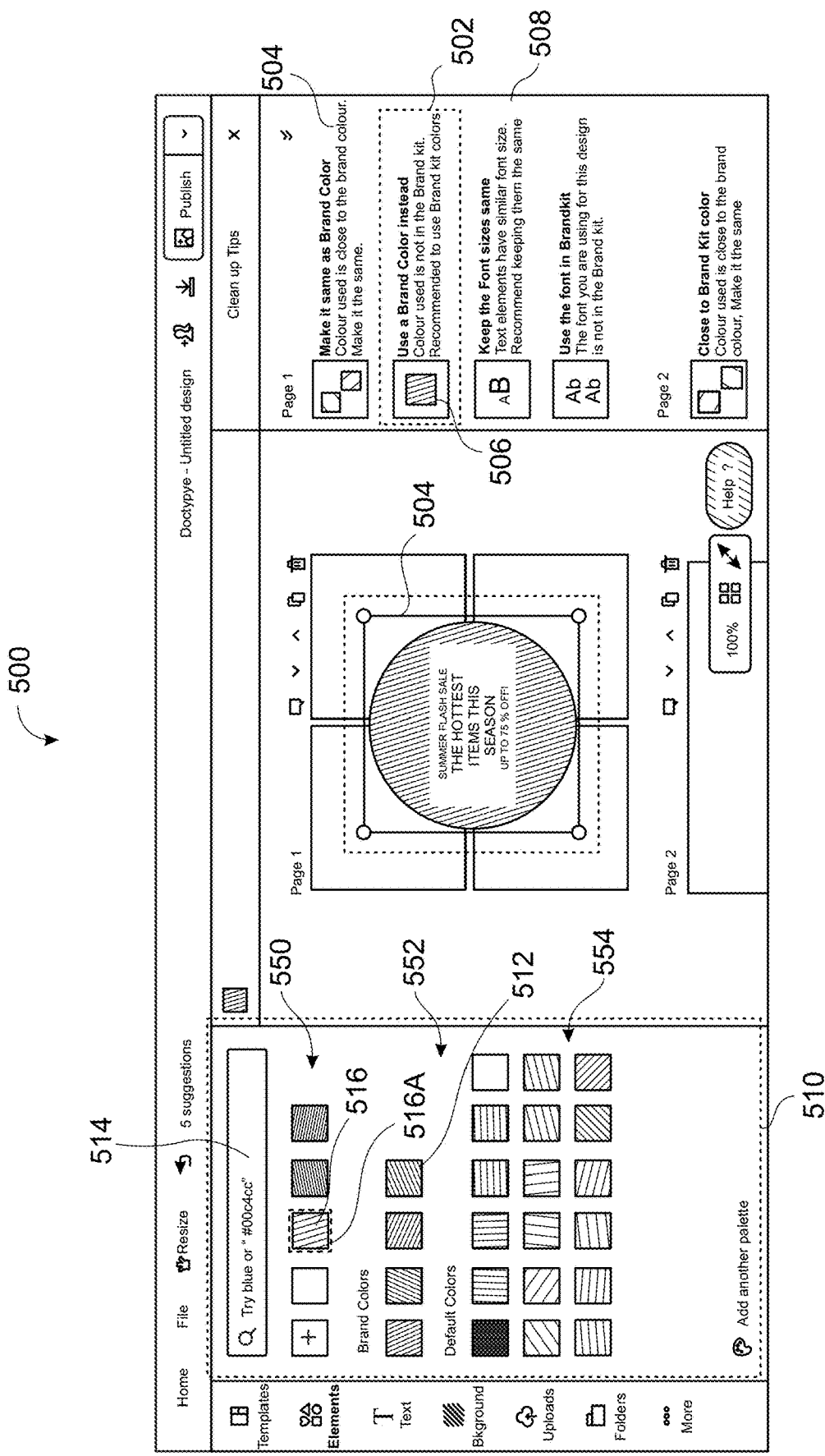

FIG. 5 shows a design creation user interface 500 which is displayed by a client system 102 (the client system 102 configured to do so by client application 104). Via interface 500 a user can create a design document that comprises one or more pages and (inter alia) add elements to the page and edit elements on the page. The design creation user interface 500 may be displayed after the design creation user interface 400. For example, the design creation user interface 500 may be displayed responsive to a user selecting the diagnostic notice b) "Use a Brand Color instead" in the design creation user interface 400. The following description focusses on the parts of design creation user interface 500 that differ from design creation user interface 400 and like components are referred to with the same reference number. Parts of the user interface not referred to in relation to design creation user interface 500 perform the same function as described in relation to the design creation user interface 400 and vice-versa. The same approach has been applied to FIG. 6, described herein below.

The design creation user interface 500 provides feedback to the user on which diagnostic notice has been selected, which in the example of FIG. 5 is by highlighting the notice 502 itself. The design creation user interface 500 provides feedback to the user as to which design element the selected diagnostic notice relates, which in the example of FIG. 5 is by adding a box 504 about the design element, which is the circle design element 458. The process of highlighting a design element to which a selected diagnostic notice applies is represented in FIG. 5 by the bounding boxes around the notice 500 and the circle design element 458, which boxes need not form part of the design creation user interface 500.

Figure 6:
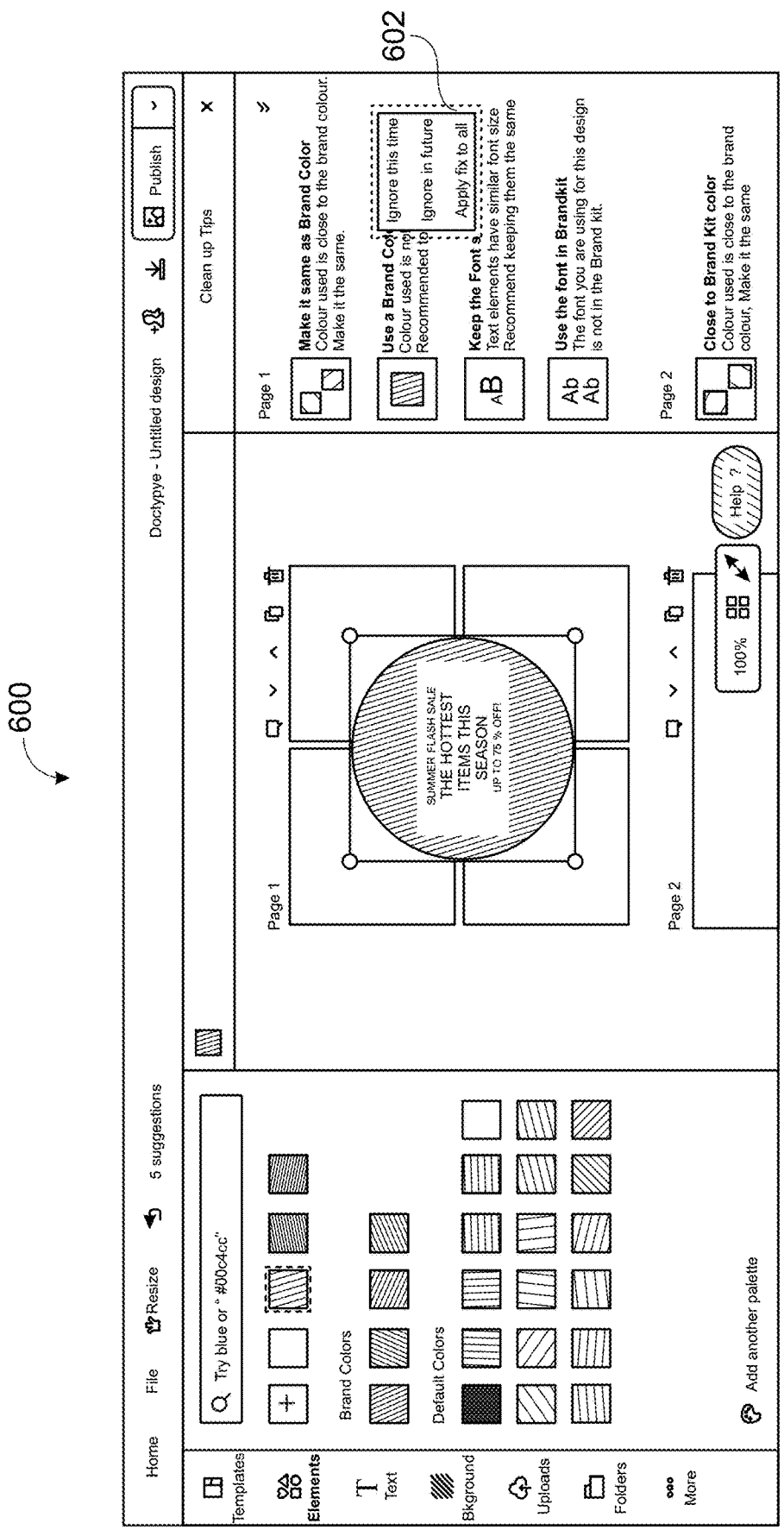

In the example of FIGS. 4 to 6, the diagnostic notices include or are displayed with a graphical representation of the issue that the notice relates to. The graphical representation may be selected and/or adapted based on the attribute that the notice relates to. For example, the notice 502 includes or is displayed with a coloured box 506, the selection of a coloured box for the graphical representation is based on the diagnostic notice relating to a colour attribute of the circle design element 458. The selected colour for the coloured box corresponds to the colour identified by the colour attribute of the circle design element 458 or a colour to which the system is suggesting a change to. In another example, notice 504 includes or is displayed with two coloured boxes, one with a colour corresponding to the colour identified by the colour attribute of the design element to which it relates and another corresponding to a colour identified by the brand kit 146 associated with the user, in particular the colour in the brand kit that is closest to the existing colour of the design element. In two other examples, notices 506 and 508 relate to font attributes of a design element (either the same design element or different design elements) and the graphical representation depicts different sized fonts in relation to notice 506 and different font types in relation to notice 508, reflecting the particular font attribute referred to.

The design creation user interface 500 includes a function to selectively display user interface elements operable by the user to edit a design element to which a displayed diagnostic relates. The selective display of editing user interface elements may be responsive to selection, for example user selection, of a notice in the diagnostic display region 418 and/or responsive to selection, for example user selection, of a design element which has an associated diagnostic notice. The selection of the user interface elements to display is based on the diagnostic notice or the attribute to which the diagnostic notice relates. For example, user selection of the notice 502 or user selection of the circle design element 458 when the diagnostic display region 418 is displayed may automatically result in the display of colour palette 510. The colour palette 510 provides a user interface for editing the colour of the circle design element 458. By way of contrast, if notice 508 were initially selected or subsequently selected, then colour palette 510 would not be displayed or would cease to be displayed respectively and user interface elements for changing the font size of the relevant design element displayed instead.

In some embodiments the displayed editing user interface elements are based on the brand kit 146. For example, in FIG. 5 the colour palette 510 includes display of a set of colours 512 that are colours from the brand kit 146. Similarly font editing user interface elements may include font types and/or sizes from the brand kit 146. Accordingly, the displayed editing user interface elements may differ depending on which brand kit is active. The active brand kit may be, for example, one that is associated with the user due to being specified by an organisation to which the user belongs, or selected by the user for the particular design.

In the example of FIG. 5, the design creation user interface 500 includes a suggestion of an edit. The suggestion is based on one or both of the applicable diagnostic and the brand kit. For example the suggestion 514 in relation to circle design element 458 is a colour suggestion and suggests a colour from the brand kit 146. In some embodiments the suggestion also includes a suggested change. For example, a suggestion to use a colour from the brand kit may incorporate or include one or more suggested colours to use. For example coloured box 506 may graphically indicate the suggested colour. In some embodiments a user action, for example selecting a diagnostic message or a part thereof like a suggestion component of a diagnostic message causes the suggested change to be previewed or made in the design document and displayed in the design presentation region 402. The selection of a colour from within the brand kit to suggest may be determined by a heuristic. An example heuristic may be one that determines the colour from the brand kit with the smallest magnitude difference to the existing colour of the design element. Example measures of magnitude difference in colour are the Delta E 76 and Delta E 2000 measures. In relation to font size, the heuristic may select the closest font size from the brand kit 146. The heuristic may also take into account other variables, including for example a type of the design element. For instance if the design element is text and is designated as a heading or has a relative size in the design indicating it is a heading and the brand kit has a font style and/or type designated for headings, then the suggestion may be for the heading font from the brand kit.

The displayed editing user interface elements may include feedback to the user on the attribute of the design element to which the diagnostic relates. For example, in FIG. 5 a colour block 516 with a colour corresponding to the colour of the circle design element 458 is displayed in a manner to indicate that it is the colour of the circle design element 458. The example manner of display in FIG. 5 is to display the colour block 516 with a highlight 516A and to display the colour block 516 in a particular region 550 of the design creation user interface 500, in this case still within the colour palette 510 but different to a region 552 displaying the brand kit colours and different to a region 554 displaying other colours available for selection (in this example a set of default colour choices). In the example of FIG. 5, region 550 is also used to display other colours used in the design.

Returning to the suggestion 514, which in this case is to for "blue" or colour "00c4cc", the user may select the magnifying glass option to search for the suggested colour. In response to that the suggested colour within region 552 may be highlighted to draw the user's attention to it. Alternatively, the suggested colour may be displayed and highlighted without displaying a separate suggestion, in which case the user may apply the suggestion directly with a single user input.

FIG. 6 shows a design creation user interface 600 which is displayed by a client system 102 (the client system 102 configured to do so by client application 104). Via interface 600 a user can create a design document that comprises one or more pages and (inter alia) add elements to the page and edit elements on the page. The design creation user interface 600 may be displayed after the design creation user interface 400 or after the design creation user interface 500. For example, the design creation user interface 600 may be displayed responsive to a user selecting the diagnostic notice b) "Use a Brand Color instead" in the user interface 400 or 500 using an alternative selection mechanism to that used to transition to user interface 500 from user interface 400. For example one selection mechanism may be left click selection and the other a right click selection and/or one transition may be invoked on selecting an additional icon or menu item in the user interface 500.

As shown in FIG. 6, the design creation user interface 600 includes selectable options 602 for actions to be taken with respect to a diagnostic. In the example of FIG. 6 the options include "Ignore this time", "Ignore in future" and "Apply fix to all". The Ignore this time option may cause the selected diagnostic notice to cease to be displayed and the Ignore in future may cause any other diagnostic notices based on use of the same attribute not to be displayed. The "Apply fix to all" may be selected after a user has selected a new attribute, for instance from the colour palette 510, and in response to that all other design elements with the same colour or all other design elements of the same type (e.g. filled shapes) with the same colour updated with the same new attribute. The selectable options 602 may be displayed simultaneously with the diagnostic notice to which they relate and simultaneously with the display of the design element in the design document to which the diagnostic relates. The selectable options 602 may be displayed simultaneously with the editing user interface elements (e.g. colour palette 510) applicable to the displayed and selected diagnostic notice.

Responsive to or following a user selection of a new attribute using the editing user interface elements, the new attribute is applied to the design element and the data store 108 is updated. Also responsive to or following the user selection, the linter 300 applies the rules 302 applicable to the design element again. The diagnostic display region 418 and diagnostic display icon 420 are then updated to reflect the new linting, for example by removing a diagnostic and potentially replacing it with a new diagnostic. Also responsive to or following the user selection, the colour block 516 (or other feedback mechanism for other attributes) may be updated to show the currently applied colour.

Table 2 describes example rules 302 that may be applied by the linter 300. Where particular thresholds are specified, they are examples only and other thresholds may be used. The group of rules applied and/or the thresholds of those rules may be configurable, for example by any user, or by the user(s) with control over a brand kit or other administrator user.

TABLE 2

| Linter rules | | |
| --- | --- | --- |
| Rule | Description | Example trigger |
| Color Consistency | Make sure that colours are the same, for elements/ backgrounds that are almost the same colour. | Uses Delta E 76 formula to determine difference in colour, with threshold of 49 to trigger a diagnostic |
| Font Size Consistency | Make sure font sizes are the same, for text elements that have the same font and are almost the same font size. | Compare font size attributes and trigger a diagnostic when text of the same font is within a threshold of 5 points |

TABLE 2-continued

Linter rules

| Rule | Description | Example trigger |
| --- | --- | --- |
| Color Brandkit | Make sure that all colours used are in the brand kit. | Colours that do not belong to at least one palette in the brand kit trigger a diagnostic |
| Font Brandkit | Make sure that all fonts used are in the brand kit. | Fonts that do not belong to at least one palette in the brand kit trigger a diagnostic |
| Media Brandkit | Make sure that all images used are in the brand kit. | Image assets that do not belong to the brand kit trigger a diagnostic |
| Print bleed | Make sure elements in a print design are not within the print bleed of a document. | Design elements with position and size attributes that place a part of the design element within a print bleed trigger a diagnostic and block the user from publishing without acknowledgement or action |
| Text readable | Make sure text elements in a print design are of sufficient, readable font size. | Text elements with font size attributes that would not be readable upon print trigger a diagnostic and block the user from publishing without acknowledgement or action |
| Image quality | Make sure image assets in a print design are of minimum quality | Image assets with a DPI below an acceptable threshold determined by document type (e.g. 100 dpi for posters) trigger a diagnostic and block the user from publishing without acknowledgement or action |
| Element margins | Make sure elements are not too close to each other. | Design elements with position and size attributes that place a part of the design element within a threshold distance of another design element triggers a diagnostic |
| Page margins | Make sure elements are not too close to the edge of the page. | Design elements with position and size attributes that place a part of the design element within a page margin (which may be an attribute of a page stored in data store 108) trigger a diagnostic. May be the same as Print Bleed with a configurable threshold and without the publish block. |
| Consistent spacing | If there is a sequence of items (e.g. textboxes), make sure they are spaced evenly on the main axis. | Design elements disposed horizontally or vertically (and optionally diagonally) with a common reference along a common line or within a threshold distance of the common line and which have varying spacing between them trigger a diagnostic |
| Consistent alignment | If there is a sequence of items, make sure they are spaced evenly on the cross axis. | Design elements disposed horizontally or vertically (and optionally diagonally) with a common reference along within a threshold distance of a common line trigger a diagnostic |
| Overlapping elements | Make sure elements are not overlapping. | May be the same as element margins, with a threshold distance of zero |
| Colour contrast checking | Checking that foreground design elements, in particular or text, has good colour contrast against its background, for all audiences (colourblind, low vision, in sunlight, etc). | Design elements with contrast below a threshold trigger a diagnostic |

TABLE 2-continued

Linter rules

| Rule | Description | Example trigger |
| --- | --- | --- |
| Brand asset/logo | Check that the brand asset/logo is displayed on the page | Designs without a specified brand asset or logo, for instance from a band kit, trigger a diagnostic |
| Approved template without modification | Check that an approved template has been used | Designs by users associated with a brand kit including templates that are not in line with any template trigger a diagnostic |
| CMYK Check | Make sure that every colour in the document has a CMYK mapping | Design elements with attributes without a CMYK mapping trigger a diagnostic |
| Word breaking | Make sure that the majority of words on a page are not broken | Text elements whose majority of words are broken over multiple lines trigger a diagnostic |

The linter 300 may run the collectors 304 and apply the rules 302 periodically on a time basis, in response to detection of an attribute being updated or added (e.g. with a design element) to the data store 108, in response to a user request to run the lint, or in response to another operation. In some embodiments, the linter 300 applies the rules 302 to the attributes collected by the collectors 304 across an entire design document. In other embodiments, the linter 300 applies the rules 302 selectively in relation to parts of design documents that are changed or in relation to parts of the design documents identified by a user when providing the input to operate the linter 300.

In one example, when a page is added or edited, then the linter 300 operates in relation to that page. For instance referring to FIG. 1, if an attribute of Element A is changed, then the linter 300 applies the rules 302 to attributes collected by the collectors 304 across Page A only. In another example, the linter 300 may operate in relation to only the element that has been updated. The client system 110 and/or server system 102 may be configured to cache the diagnostics to facilitate more efficient linting.

The diagnostics for a design document may be persistently stored in data store 108. For example, the diagnostics may be retained when the design document is closed. This avoids having to re-run diagnostics across the entire design document every time it is opened. Additionally, actions in relation to a design document may be stored in the data store 108. For example the data stored for diagnostics 306 may include an indicator that the attribute has been considered and selected to be ignored, for instance using selectable options 602 described above. A diagnostic 306 previously selected to be ignored may not be displayed for subsequent operations, for example when a document is closed and reopened or when the linter 300 is reapplied to the page. In some embodiments the user interface is configured to display, on user request, the diagnostics that have been selected to be ignored, to enable review by that user or a different user.

It will be understood from the foregoing description that a computer processing system can be configured, for example by appropriate software and/or hardware to perform various routines or methods. Example methods are described in FIGS. 7 to 14. Each of these figures describe a method that may be implemented independently from the other methods or combined with one or more of the other methods to form a multi-function computer processing system. Further steps and sub-steps of the method will be apparent from the foregoing description of embodiments described in relation to FIGS. 1 to 6.

Figure 7:
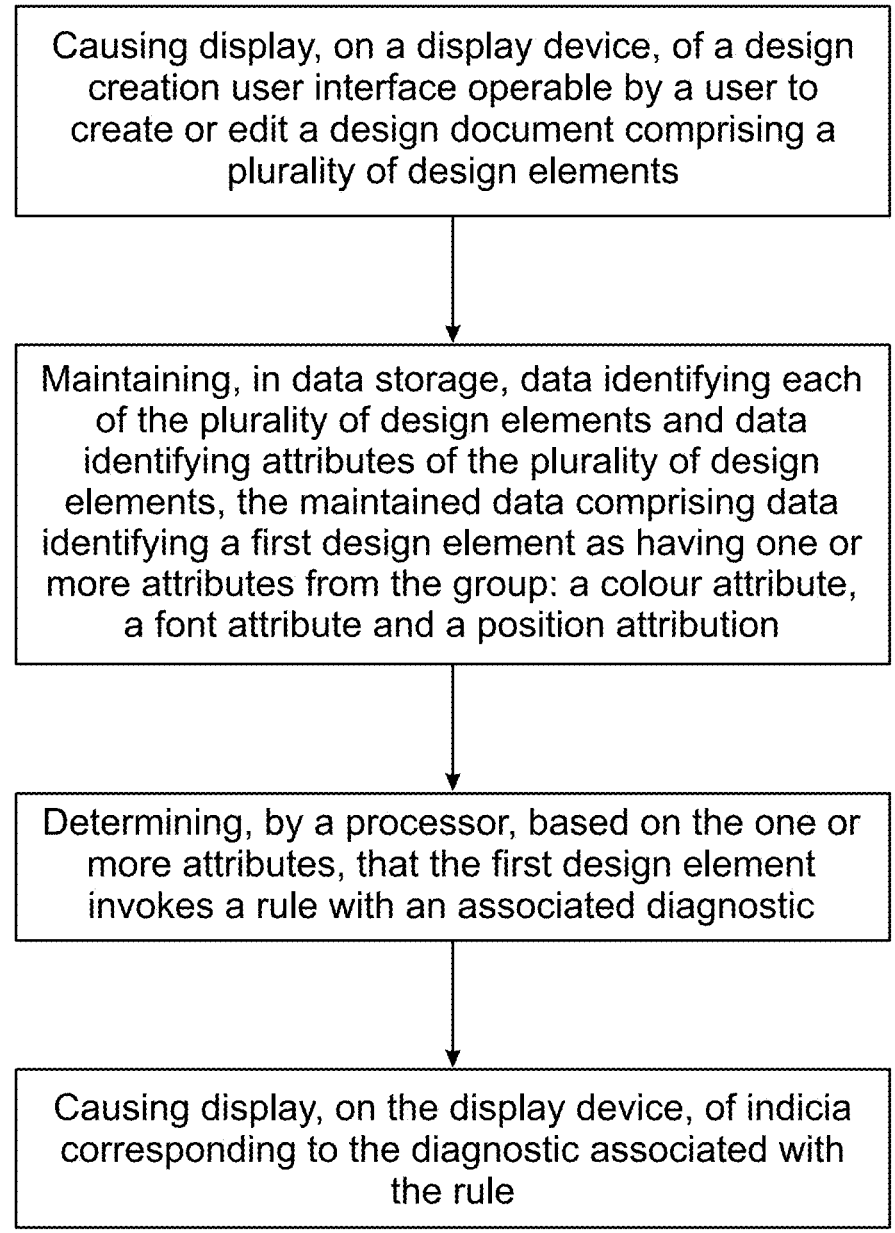
FIG. 7 to FIG. 14 show flow diagrams of example methods for a computer processing system, for example a computer processing system of FIG. 2.

Referring to FIG. 7, a computer implemented method includes: causing display, on a display device, of a design creation user interface operable by a user to create or edit a design document comprising a plurality of design elements; maintaining, in data storage, data identifying each of the plurality of design elements and data identifying attributes of the plurality of design elements, the maintained data comprising data identifying a first design element as having one or more attributes from the group: a colour attribute, a font attribute and a position attribution; determining, by a processor, based on the one or more attributes, that the first design element invokes a rule with an associated diagnostic; causing display, on the display device, of indicia corresponding to the diagnostic associated with the rule.

Figure 8:
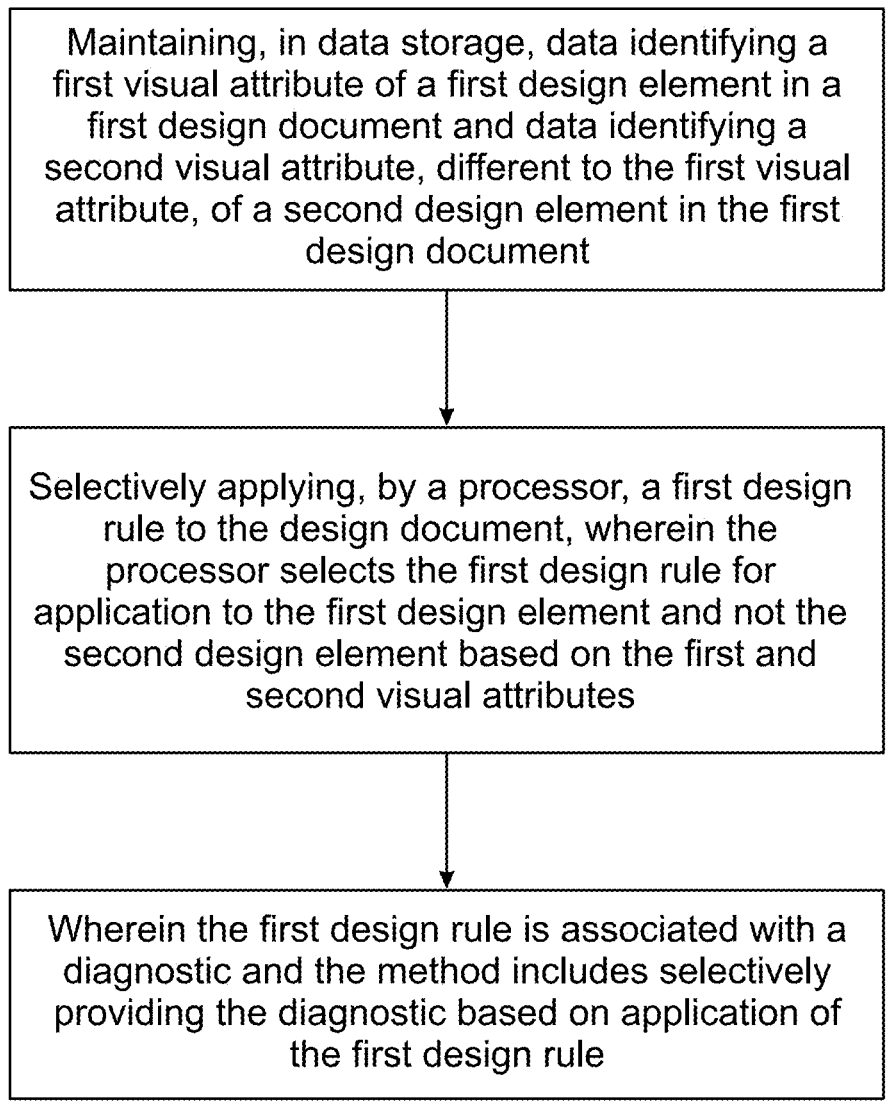

Referring to FIG. 8, a computer implemented method includes: maintaining, in data storage, data identifying a first visual attribute of a first design element in a first design document and data identifying a second visual attribute, different to the first visual attribute, of a second design element in the first design document; selectively applying, by a processor, a first design rule to the design document, wherein the processor selects the first design rule for application to the first design element and not the second design element based on the first and second visual attributes; wherein the first design rule is associated with a diagnostic and the method includes selectively providing the diagnostic based on application of the first design rule.

Figure 9:
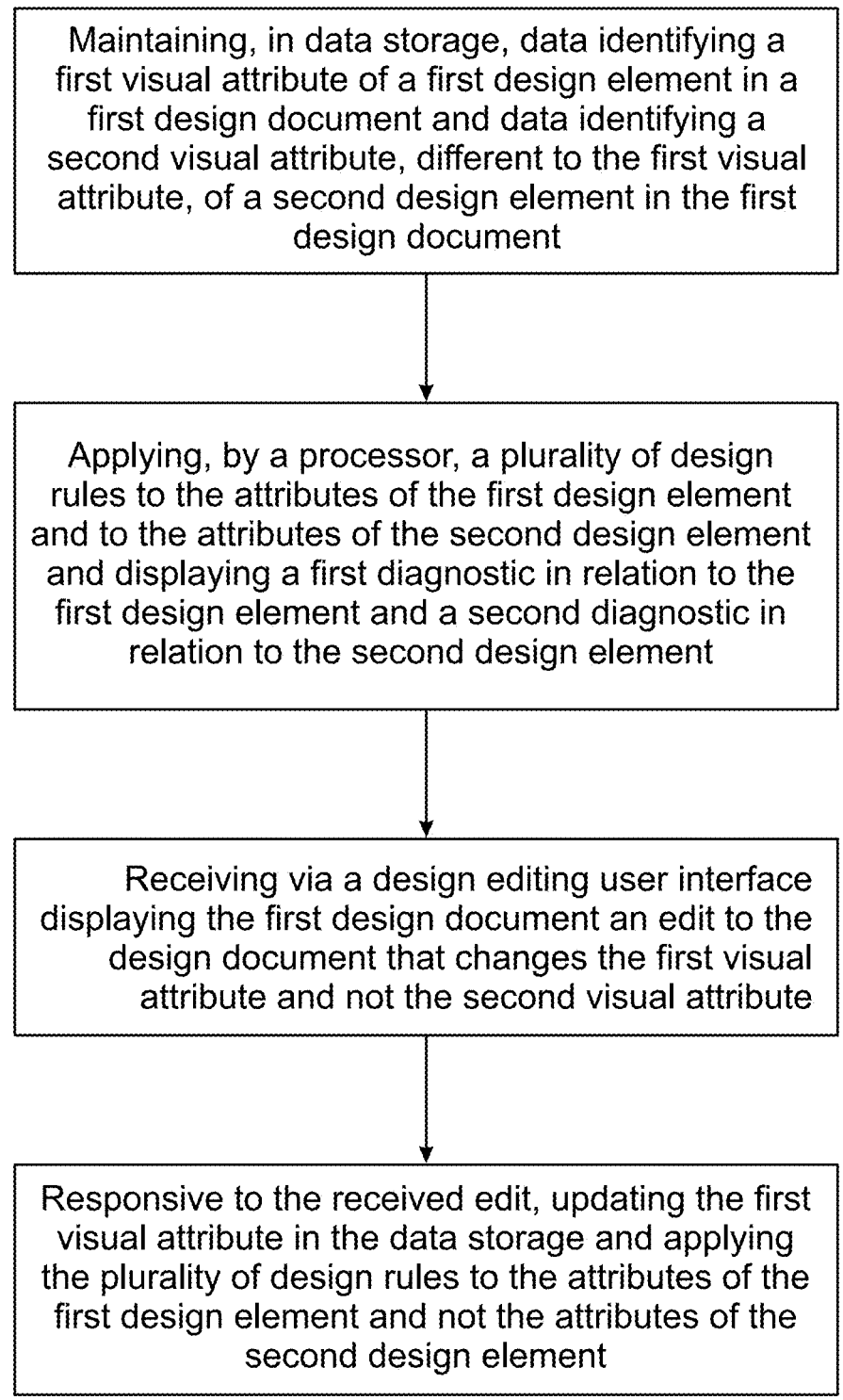

Referring to FIG. 9, a computer implemented method includes: maintaining, in data storage, data identifying a first visual attribute of a first design element in a first design document and data identifying a second visual attribute, different to the first visual attribute, of a second design element in the first design document; applying, by a processor, a plurality of design rules to the attributes of the first design element and to the attributes of the second design element and displaying a first diagnostic in relation to the first design element and a second diagnostic in relation to the second design element; receiving via a design editing user interface displaying the first design document an edit to the design document that changes the first visual attribute and not the second visual attribute; responsive to the received edit, updating the first visual attribute in the data storage and applying the plurality of design rules to the attributes of the first design element and not the attributes of the second design element.

Figure 10:
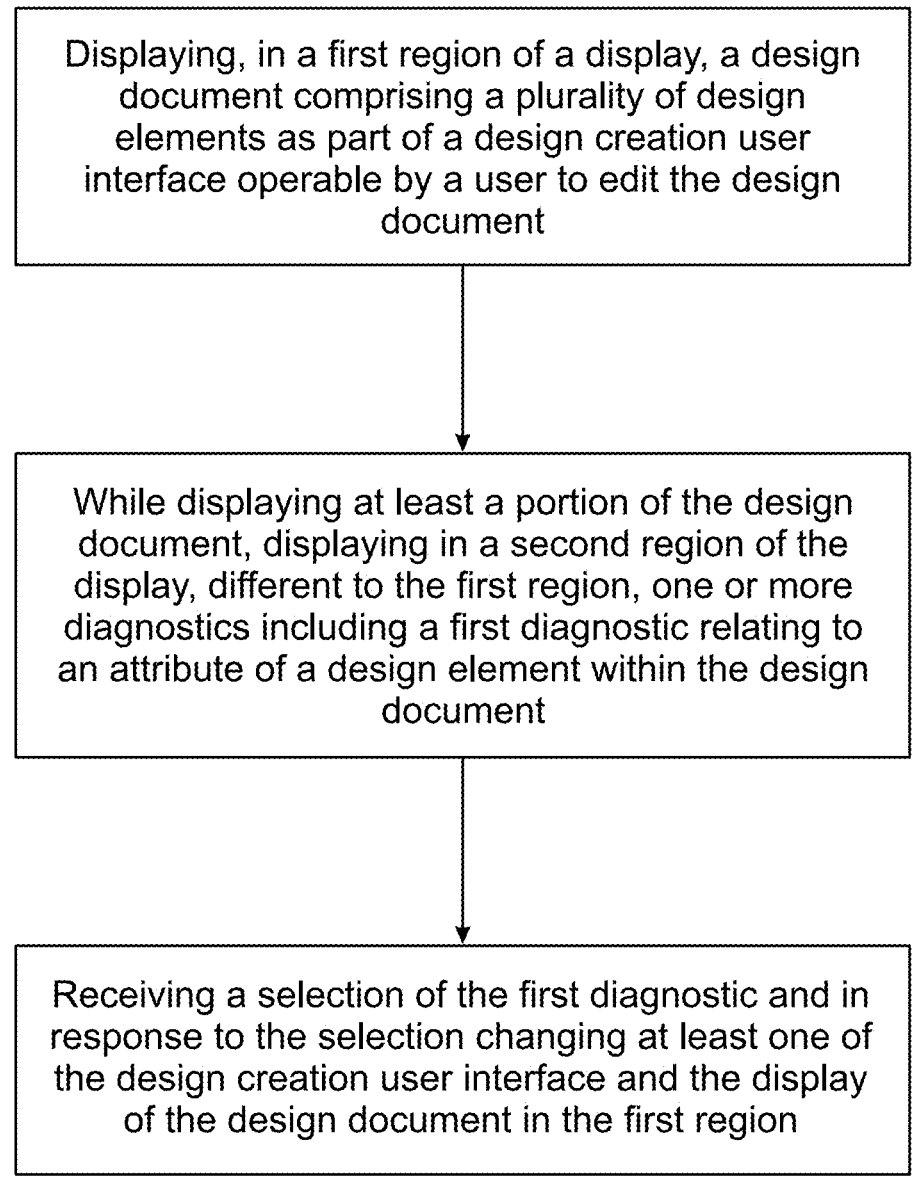

Referring to FIG. 10, a computer implemented method includes: displaying, in a first region of a display, a design document comprising a plurality of design elements as part of a design creation user interface operable by a user to edit the design document; while displaying at least a portion of the design document, displaying in a second region of the display, different to the first region, one or more diagnostics including a first diagnostic relating to an attribute of a design element within the design document; receiving a selection of the first diagnostic and in response to the selection changing at least one of the design creation user interface and the display of the design document in the first region.

Figure 11:
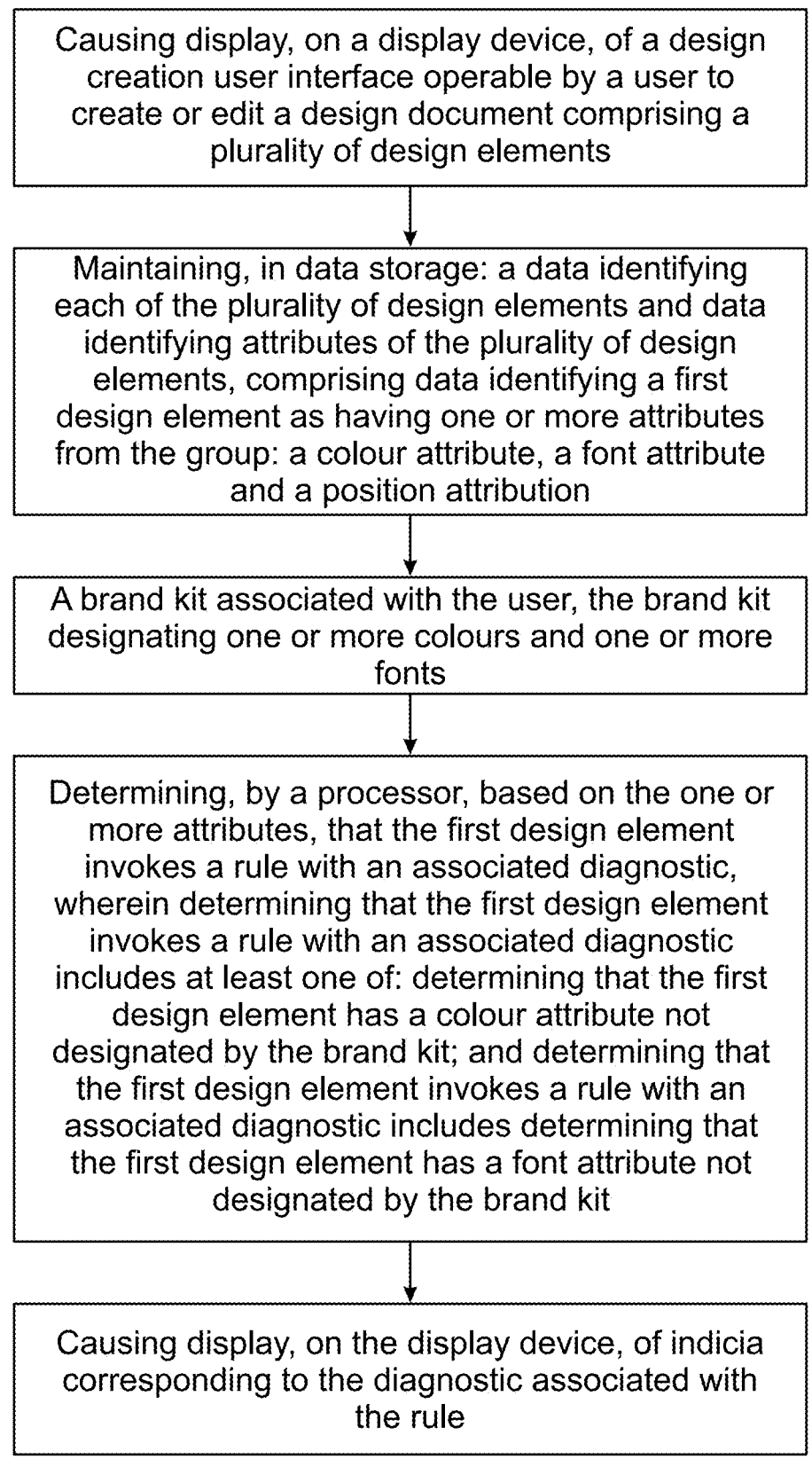

Referring to FIG. 11, a computer implemented method includes: causing display, on a display device, of a design creation user interface operable by a user to create or edit a design document comprising a plurality of design elements; maintaining, in data storage data identifying each of the plurality of design elements and data identifying attributes of the plurality of design elements, comprising data identifying a first design element as having one or more attributes from the group: a colour attribute, a font attribute and a position attribution and a brand kit associated with the user, the brand kit designating one or more colours and one or more fonts; determining, by a processor, based on the on the one or more attributes, that the first design element invokes a rule with an associated diagnostic, wherein determining that the first design element invokes a rule with an associated diagnostic includes at least one of: determining that the first design element has a colour attribute not designated by the brand kit; and determining that the first design element invokes a rule with an associated diagnostic includes determining that the first design element has a font attribute not designated by the brand kit; causing display, on the display device, of indicia corresponding to the diagnostic associated with the rule.

Figure 12:
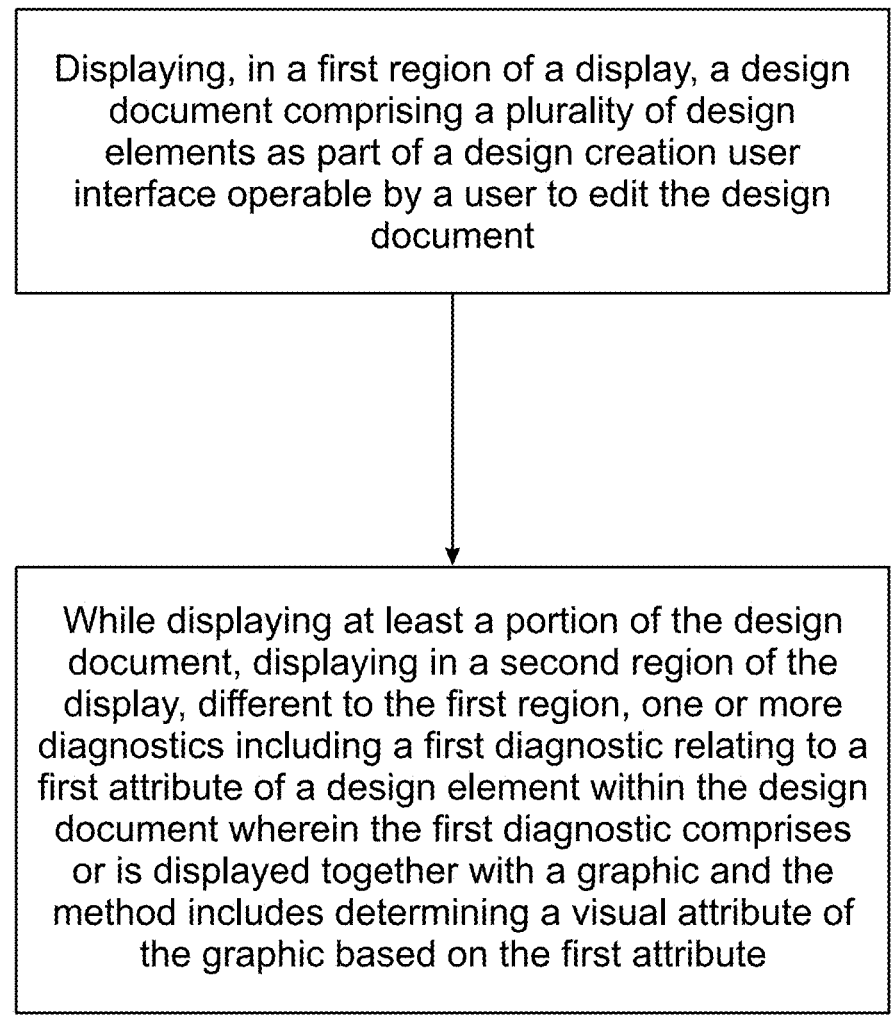

Referring to FIG. 12, a computer implemented method includes: displaying, in a first region of a display, a design document comprising a plurality of design elements as part of a design creation user interface operable by a user to edit the design document; while displaying at least a portion of the design document, displaying in a second region of the display, different to the first region, one or more diagnostics including a first diagnostic relating to a first attribute of a design element within the design document; wherein the first diagnostic comprises or is displayed together with a graphic and the method includes determining a visual attribute of the graphic based on the first attribute.

Figure 13:
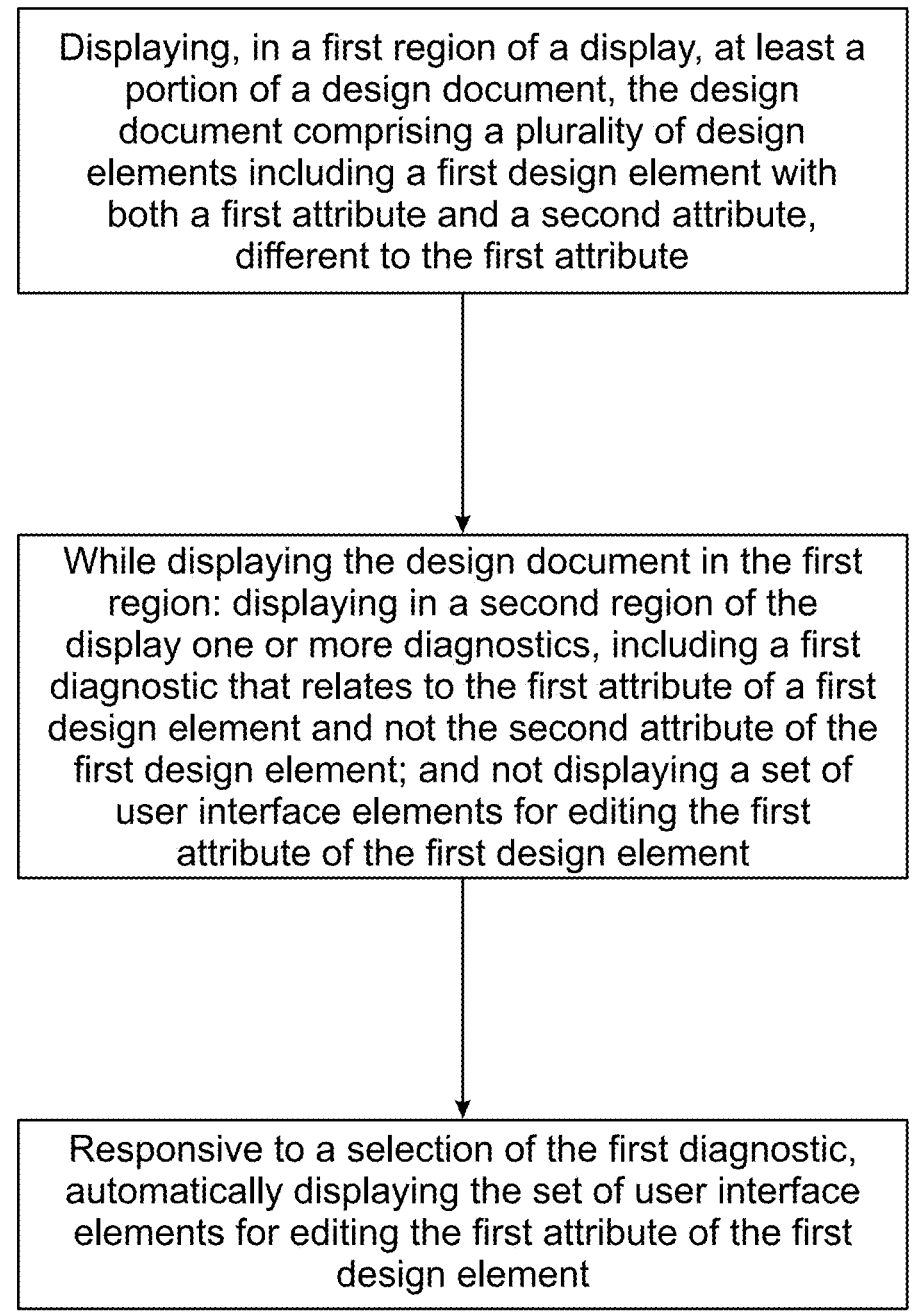

Referring to FIG. 13, a computer implemented method includes: displaying, in a first region of a display, at least a portion of a design document, the design document comprising a plurality of design elements including a first design element with both a first attribute and a second attribute, different to the first attribute; and while displaying the design document in the first region: displaying in a second region of the display one or more diagnostics, including a first diagnostic that relates to the first attribute of a first design element and not the second attribute of the first design element; not displaying a set of user interface elements for editing the first attribute of the first design element; and then responsive to a selection of the first diagnostic, automatically displaying the set of user interface elements for editing the first attribute of the first design element.

Figure 14:
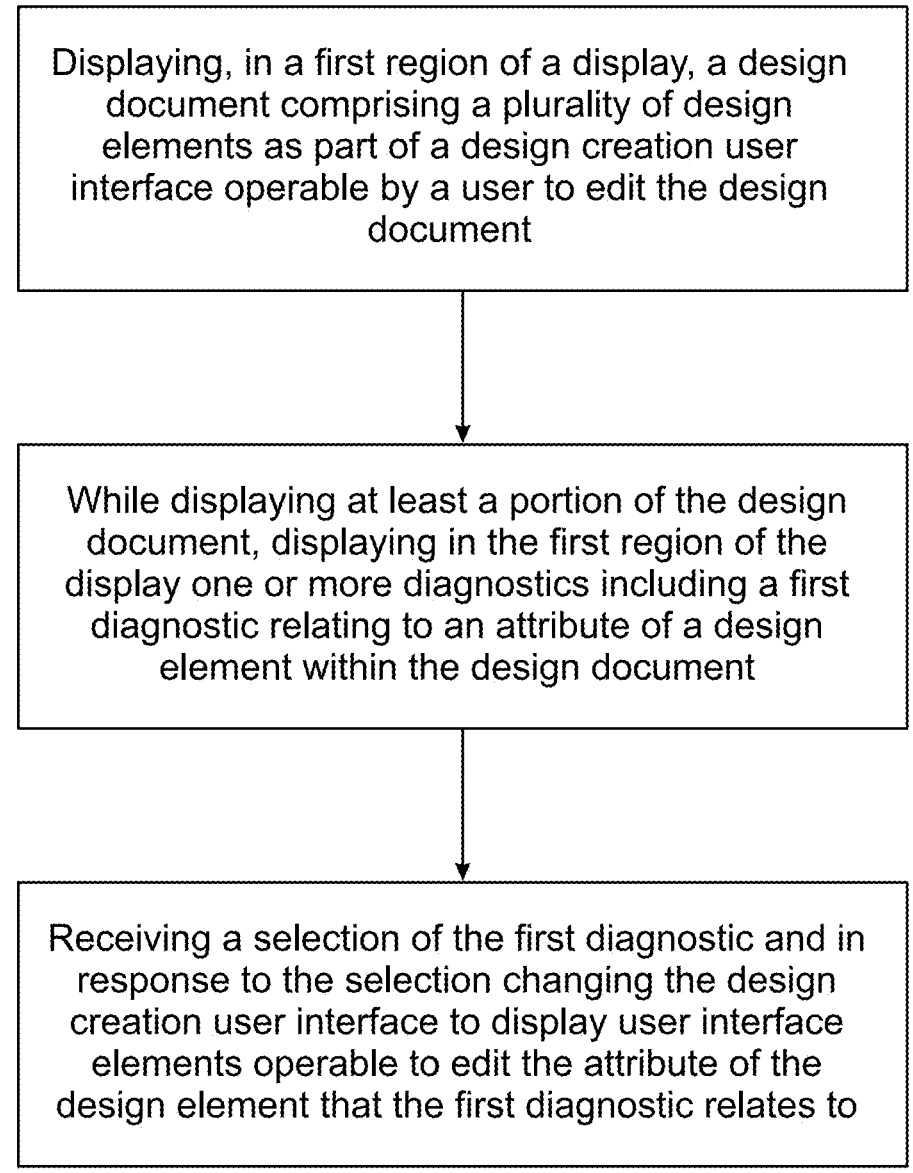

Referring to FIG. 14, a computer implemented method includes: displaying, in a first region of a display, a design document comprising a plurality of design elements as part of a design creation user interface operable by a user to edit the design document; while displaying at least a portion of the design document, displaying in the first region of the display one or more diagnostics including a first diagnostic relating to an attribute of a design element within the design document; receiving a selection of the first diagnostic and in response to the selection changing the design creation user interface to display user interface elements operable to edit the attribute of the design element that the first diagnostic relates to.

Unless otherwise stated, the terms "include" and "comprise" (and variations thereof such as "including", "includes", "comprising", "comprises", "comprised" and the like) are used inclusively and do not exclude further features, components, integers, steps, or elements.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method comprising:
displaying, in a first region of a display, a design document comprising a plurality of design elements, as part of a design creation user interface operable by a user to edit the design document, including displaying at least a first portion of the design document that includes a first design element with both a first attribute and a second attribute, different to the first attribute;
while displaying in the first region of the display the at least a first portion of the design document that includes the first design element:
displaying in the design creation user interface, a first set of user interface elements, the first set of user interface elements including one or more diagnostics, including a first diagnostic relating to the first attribute of the first design element within the design document and not the second attribute of the first design element; and
not displaying a second set of user interface elements, the second set of user interface elements including one or more user interface elements for editing the first attribute of the first design element;
receiving a selection of the first diagnostic;
in response to the selection of the first diagnostic, changing the design creation user interface to display the second set of user interface elements,
wherein the design document comprises a plurality of pages and wherein the method further includes, responsive to navigation to a new page in the design document, automatically ceasing to display at least one of the one or more diagnostics and displaying at least one new diagnostic relating to an element of the new page.

2. The computer implemented method of claim 1, comprising displaying a graphic, wherein the first diagnostic comprises the graphic or is displayed together with the graphic, and wherein the method includes determining a visual attribute of the graphic based on the first attribute.

3. The computer implemented method of claim 1, wherein the first diagnostic is displayed in a second region of the display, different to the first region.

4. The computer implemented method of claim 3, wherein the second set of user interface elements is displayed in a third region of the display, different to the first region and the second region.

5. The computer implemented method of claim 3, wherein the first set of user interface elements is displayed in the first region of the display.

6. The computer implemented method of claim 3, further comprising, prior to the display of the design document in the first region of the display:
   displaying the design document in a third region of the display, wherein the third region is larger than the first region; and
   receiving a user selection of a diagnostic display icon;
   wherein the display of the design document in the first region of a display is responsive to receiving the selection of the diagnostic display icon.

7. The computer implemented method of claim 6, further comprising, after the display of the design document in the first region of the display, receiving a further user selection and in response to the further user selection displaying the design document in the third region of the display.

8. The computer implemented method of claim 6, wherein the third region of the display covers some or all of an area of the display occupied by the second region of the display.

9. The computer implemented method of claim 1, wherein the first diagnostic is displayed in the first region of the display.

10. The computer implemented method of claim 9, wherein the second set of user interface elements is displayed in a second region of the display, different to the first region.

11. The computer implemented method of claim 9, wherein the second set of user interface elements is displayed in the first region of the display.

12. The computer implemented method of claim 1, further comprising, responsive to receiving the selection of the first diagnostic, highlighting the first design element in the first region of the display.

13. The computer implemented method of claim 12, further comprising receiving a selection of a user interface element in the second set of user interface elements, and in response to receiving the selection of a user interface element changing a value of the first attribute of the first design element.

14. The computer implemented method of claim 1, further comprising:
   maintaining in data storage a brand kit associated with a current user, different to another brand kit maintained in data storage for another user, the brand kit designating one or more colours and one or more fonts; and
   prior to displaying the first diagnostic determining that the first diagnostic is to be displayed, wherein determining that the first diagnostic is to be displayed comprises at least one of:
   determining that the first design element has a colour attribute not designated by the brand kit; and
   determining that the first design element has a font attribute not designated by the brand kit.

15. The computer implemented method of claim 1, further comprising:
   while displaying the at least first portion of the design document:
   displaying in the design creation user interface, a second diagnostic relating to a third attribute of a second design element within the design document and not a fourth attribute of the second design element; and
   not displaying a third set of user interface elements, the third set of user interface elements including one or more user interface elements for editing the third attribute of the second design element; and
   receiving a selection of the second diagnostic and in response to receiving the selection of the second diagnostic changing the design creation user interface to display the third set of user interface elements;
   wherein the first attribute of the first design element is different to the third attribute of the second design element and the second set of user interface elements is different to the third set of user interface elements.

16. The computer implemented method of claim 1, wherein the second set of user interface elements comprises a first user interface element for changing the first attribute from a current value to a first value and a second user interface element for changing the first attribute from the current value to a second value, different to the first value.

* * * * *